US012186260B2

(12) United States Patent
Lagerström

(10) Patent No.: US 12,186,260 B2
(45) Date of Patent: Jan. 7, 2025

(54) ADJUSTABLE MECHANICAL CPR DEVICE FOR A RANGE OF PATIENT SIZES

(71) Applicant: PHYSIO-CONTROL, INC., Redmond, WA (US)

(72) Inventor: Jonas Lagerström, Fagersanna (SE)

(73) Assignee: PHYSIO-CONTROL, INC., Redmond, WA (US)

( * ) Notice: Subject to any disclaimer, the term of this patent is extended or adjusted under 35 U.S.C. 154(b) by 724 days.

(21) Appl. No.: 17/198,543

(22) Filed: Mar. 11, 2021

(65) Prior Publication Data

US 2021/0283009 A1 Sep. 16, 2021

Related U.S. Application Data

(60) Provisional application No. 62/988,736, filed on Mar. 12, 2020.

(51) Int. Cl.
*A61H 31/00* (2006.01)

(52) U.S. Cl.
CPC ......... *A61H 31/006* (2013.01); *A61H 31/005* (2013.01); *A61H 2201/0192* (2013.01); *A61H 2201/5058* (2013.01)

(58) Field of Classification Search
CPC ...... A61H 31/00; A61H 31/02; A61H 31/004; A61H 31/005; A61H 31/006; A61H 31/007; A61H 31/008; A61H 2201/0192; A61H 2201/5058; A61H 2201/5064
USPC ............ 601/41
See application file for complete search history.

(56) References Cited

U.S. PATENT DOCUMENTS

| | | | | |
|---|---|---|---|---|
| 2,484,306 A * | 10/1949 | McClain et al. | A61H 31/007 | 601/41 |
| 3,489,140 A * | 1/1970 | Mullikin | A61H 31/008 | 601/41 |
| 3,627,088 A * | 12/1971 | Muller | A61H 31/008 | 192/142 R |
| 3,739,771 A * | 6/1973 | Gaquer | A61H 31/008 | 601/41 |
| 3,782,371 A * | 1/1974 | Derouineau | A61H 31/007 | 601/41 |
| 4,632,094 A * | 12/1986 | Thomas | A61H 31/008 | 601/41 |
| 5,184,606 A * | 2/1993 | Csorba | A61H 31/008 | 601/134 |
| 5,823,185 A * | 10/1998 | Chang | A61H 31/007 | 601/41 |
| 6,290,660 B1 * | 9/2001 | Epps | A61H 23/0254 | 601/111 |

(Continued)

*Primary Examiner* — Samchuan C Yao
*Assistant Examiner* — Nicholas B. Engel
(74) *Attorney, Agent, or Firm* — Miller Nash LLP

(57) ABSTRACT

An adjustable chest compression device that can adjust to accommodate a variety of patient sizes. The chest compression device can include adjustable support legs structured to support the chest compression mechanism at a distance from the base member and adjust to accommodate a patient size. Another adjustable chest compression device can include adjustable legs that can adjust to accommodate different patient sizes, as well as perform the chest compressions using the adjustable legs. An extension, such as a back plate and/or leg extension can be added to a chest compression device to make the chest compression device taller and/or wider to accommodate larger patients.

18 Claims, 25 Drawing Sheets

(56) References Cited

U.S. PATENT DOCUMENTS

| | | | | |
|---|---|---|---|---|
| 7,775,996 | B2 * | 8/2010 | Stromsnes | A61H 31/006 601/44 |
| 8,002,720 | B2 * | 8/2011 | Hansen | A61H 31/008 601/41 |
| 9,016,283 | B2 * | 4/2015 | Paulussen | A61H 31/008 128/870 |
| 9,149,412 | B2 * | 10/2015 | Faller | A61H 31/006 |
| 9,539,172 | B1 * | 1/2017 | Morgan | A61H 31/005 |
| 9,539,173 | B2 * | 1/2017 | Jeppsson | A61H 31/006 |
| 9,603,772 | B2 * | 3/2017 | Jeppsson | A61H 31/006 |
| 9,629,776 | B2 * | 4/2017 | Nilsson | A61H 31/008 |
| 9,707,151 | B2 * | 7/2017 | Woerlee | A61H 31/004 |
| 9,757,299 | B2 * | 9/2017 | Hight | A61G 13/104 |
| 9,775,771 | B2 | 10/2017 | Stemple et al. | |
| 9,877,883 | B2 * | 1/2018 | Jackson | A61G 7/05 |
| 9,956,135 | B2 * | 5/2018 | Stemple | A61H 31/006 |
| 10,004,662 | B2 * | 6/2018 | Jeppsson | A61H 31/006 |
| 10,292,888 | B2 | 5/2019 | Wilson et al. | |
| 10,426,697 | B2 * | 10/2019 | Walden | A61H 31/006 |
| 10,517,793 | B2 * | 12/2019 | Walden | A61H 31/008 |
| 10,548,793 | B2 * | 2/2020 | McKenney | A61G 13/06 |
| 10,568,794 | B2 * | 2/2020 | Jackson | A61G 13/122 |
| 10,568,805 | B2 * | 2/2020 | Illindala | A61H 31/004 |
| 11,202,731 | B2 * | 12/2021 | Hertz | A61G 13/101 |
| 11,752,055 | B2 * | 9/2023 | Konsin | A61G 13/04 5/621 |
| 2008/0097257 | A1 * | 4/2008 | Stromsnes | A61H 31/00 601/41 |
| 2008/0097261 | A1 * | 4/2008 | Hansen | A61H 31/008 601/41 |
| 2008/0255482 | A1 * | 10/2008 | Lurie | A61H 31/005 601/41 |
| 2012/0042881 | A1 * | 2/2012 | Paulussen | A61H 31/008 601/41 |
| 2013/0184618 | A1 * | 7/2013 | Woerlee | A61H 31/006 601/41 |
| 2014/0109316 | A1 * | 4/2014 | Jackson | A61G 13/04 5/607 |
| 2014/0121576 | A1 * | 5/2014 | Nilsson | A61H 31/008 601/41 |
| 2014/0171840 | A1 * | 6/2014 | Aelen | A61H 31/006 601/41 |
| 2015/0245969 | A1 * | 9/2015 | Hight | A61G 7/0528 5/600 |
| 2015/0352002 | A1 * | 12/2015 | Jeppsson | A61H 31/005 601/41 |
| 2015/0359705 | A1 * | 12/2015 | Paulussen | A61H 31/006 601/41 |
| 2016/0128899 | A1 * | 5/2016 | Lurie | A61G 13/1215 601/41 |
| 2016/0213559 | A1 * | 7/2016 | Schiller | A61N 1/39044 |
| 2016/0296419 | A1 * | 10/2016 | Paulussen | A61H 31/006 |
| 2017/0156977 | A1 * | 6/2017 | Walden | A61H 31/006 |
| 2017/0156978 | A1 * | 6/2017 | Matsui | A61H 31/006 |
| 2017/0156979 | A1 * | 6/2017 | Walden | A61H 31/008 |
| 2017/0209336 | A1 * | 7/2017 | Rubin | A61H 31/006 |
| 2017/0348190 | A1 * | 12/2017 | Ehrstedt | A61H 31/006 |
| 2017/0354563 | A1 * | 12/2017 | McKenney | A61G 13/1285 |
| 2018/0147106 | A1 * | 5/2018 | Soundararajan | B25J 9/0009 |
| 2019/0029474 | A1 * | 1/2019 | Preece | A47K 3/282 |
| 2019/0029906 | A1 * | 1/2019 | Konsin | A61G 7/012 |
| 2019/0053977 | A1 * | 2/2019 | Matsui | A61M 16/024 |
| 2019/0159963 | A1 * | 5/2019 | Lurie | A61H 31/005 |
| 2019/0175443 | A1 * | 6/2019 | Härdig | A61H 31/005 |
| 2019/0262210 | A1 * | 8/2019 | Rideout | A61H 1/0266 |
| 2019/0296419 | A1 | 9/2019 | Smith et al. | |
| 2020/0037489 | A1 * | 2/2020 | Mollick | A01B 63/14 |
| 2020/0121552 | A1 * | 4/2020 | Reynolds | A61H 31/005 |

* cited by examiner

ADJUSTABLE MECHANICAL CPR DEVICE FOR A RANGE OF PATIENT SIZES

This disclosure claims benefit of U.S. Provisional Application No. 62/988,736, titled "ADJUSTABLE MECHANICAL CPR DEVICE FOR A RANGE OF PATIENT SIZES," filed on Mar. 12, 2020, which is incorporated herein by reference in its entirety.

TECHNICAL FIELD

This disclosure is directed to devices and methods for cardiopulmonary resuscitation (CPR) devices that delivery CPR chest compressions to a patient, and more particularly, the CPR devices that can be adjusted to accommodate a range of different patient sizes.

BACKGROUND

Conventional CPR devices are manufactured and designed for an average sized adult to receive chest compressions. However, patients requiring CPR may be smaller or larger than the average sized adult for which conventional CPR devices are designed. This can result in the CPR device not being usable on a patient or being used on the patient in a less effective or even harmful manner.

For example, some conventional CPR devices allow for some adjustments, such as moving a chest compression mechanism closer to a patient's chest for smaller patients. However, this can cause the CPR device to become off-balance and not perform chest compressions as effectively. Some conventional CPR devices may be built specifically for smaller or larger patients, but these devices require that an emergency responder carry multiple CPR devices which can take up a lot of storage.

Examples of the disclosure address these and other deficiencies of the prior art.

SUMMARY

Examples of the disclosure include an adjustable cardiopulmonary resuscitation (CPR) device for accommodating a variety of patient sizes. The CPR device can have a chest compression mechanism structured to deliver chest compressions, a base member structured to be placed underneath the patient, and adjustable support legs structured to support the chest compression mechanism at a distance from the base member and to adjust to accommodate a patient size.

In some examples, the adjustable support legs are telescopic and include a common shaft and each adjustable support legs include a cog rod connected to one or more gears. Each adjustable support leg can include an outer leg portion and an inner leg portion and a locking mechanism to lock the outer leg portion and the inner leg portion to accommodate the variety of patient sizes. The outer leg portion may be attached to a housing for the chest compression mechanism, and the inner leg portion can be attached to the base member.

In some examples, the adjustable support legs are structured to lock in place relative to the chest compression mechanism in a variety of positions. The adjustable support legs can lock in an inner position, an outer position, and at least one intermediary position to accommodate different sizes of patients.

Examples of the disclosure also include a cardiopulmonary resuscitation (CPR) device having a first motorized arm structured to attach to a base member and to cause a chest compression mechanism to deliver the chest compressions to the patient, and a second motorized arm structured to attach to the base member and to cause the chest compression mechanism to deliver the chest compressions to the patient. The chest compression mechanism can include a plunger in some examples.

A motor of the CPR device is structured to drive the first motorized arm and the second motorized arm to cause the chest compression mechanism to deliver the chest compressions to the patient. The first motorized arm includes a first portion connected to a second portion by a joint, the joint including a motor to move the first portion relative to the second portion. The second motorized arm includes a first portion connected to a second portion by a joint, the joint including a motor to move the first portion relative to the second portion.

Some examples of the disclosure include a back plate extension for accommodating patients of different sizes. The back plate extension can include a joint, an auxiliary shaft including a first shaft portion structured to rotate about the joint and a second shaft portion structured to rotate about the joint and abut the first portion when in a closed position, and a clamp including a first clamp portion structured to rotate about the joint and a second clamp portion structured to rotate about the joint and engage with the first clamp portion when in the closed position to attach with a shaft of a back plate. The back plate extension can be used when attaching a CPR device to a back plate.

Examples of the disclosure also include a CPR device having a chest compression mechanism structured to deliver chest compressions to a patient, a base member structured to be placed underneath the patient, a leg structured to support the chest compression mechanism at a distance from the base member, and a leg extension structured to attach to the leg and the base member to extend a height of the CPR device to accommodate a patient size.

Examples of the disclosure also include a CPR device having an adjustable height chest compression housing including a chest compression mechanism structured to delivery chest compressions to a patient attached to a base member by two legs structured to support the chest compression mechanism at a distance from the base member.

Examples of the disclosure also include another adjustable CPR device for accommodating a variety of patient sizes by connecting a back plate, or base member, to support legs at different heights. This adjustable CPR device includes a housing, the housing including a chest compression mechanism structured to deliver chest compressions, a first leg attached to the housing, the first leg including a first connection point and a second connection point, a second leg attached to the housing, the second leg including a first connection point and a second connection point, and a base member structured to be placed underneath the patient, the base member including a first distal end having a first attachment member structured to attach to the first connection point or the second connection point of the first leg and a second distal end having a second attachment member structured to attach to the first connection point or the second connection point of the second leg.

Other examples of the disclosure in another adjustable CPR device for accommodating a variety of patient sizes. The adjustable CPR device has a chest compression mechanism structured to deliver chest compressions, a base member structured to be placed underneath the patient, adjustable support legs structured to support the chest compression mechanism at a distance from the base member. Each adjustable support leg can include a first linear motion device configured to cause the chest compression mechanism to move towards and away from the base member, and a second linear motion device configured to adjust a length of the respective adjustable support leg. The second linear motion device can also a width between the adjustable legs to change in some examples. The chest compression mechanism may include a beam with an attached piston in some examples.

BRIEF DESCRIPTION OF THE DRAWINGS

Aspects, features and advantages of examples of the present disclosure will become apparent from the following description of examples in reference to the appended drawings in which.

DESCRIPTION

Examples of the disclosure are directed to adjustable mechanical CPR devices for accommodating a wide range of patient sizes. Having a single mechanical CPR device that can be adjusted to accommodate a variety of patient sizes will allow emergency personnel to only carry or keep one device, rather than multiple CPR device specifically designed for different sized patients. An emergency responder that only has one device will then be able to use the CPR chest compression device on almost any patient, regardless of size, when responding to an emergency situation.

Figure 1:
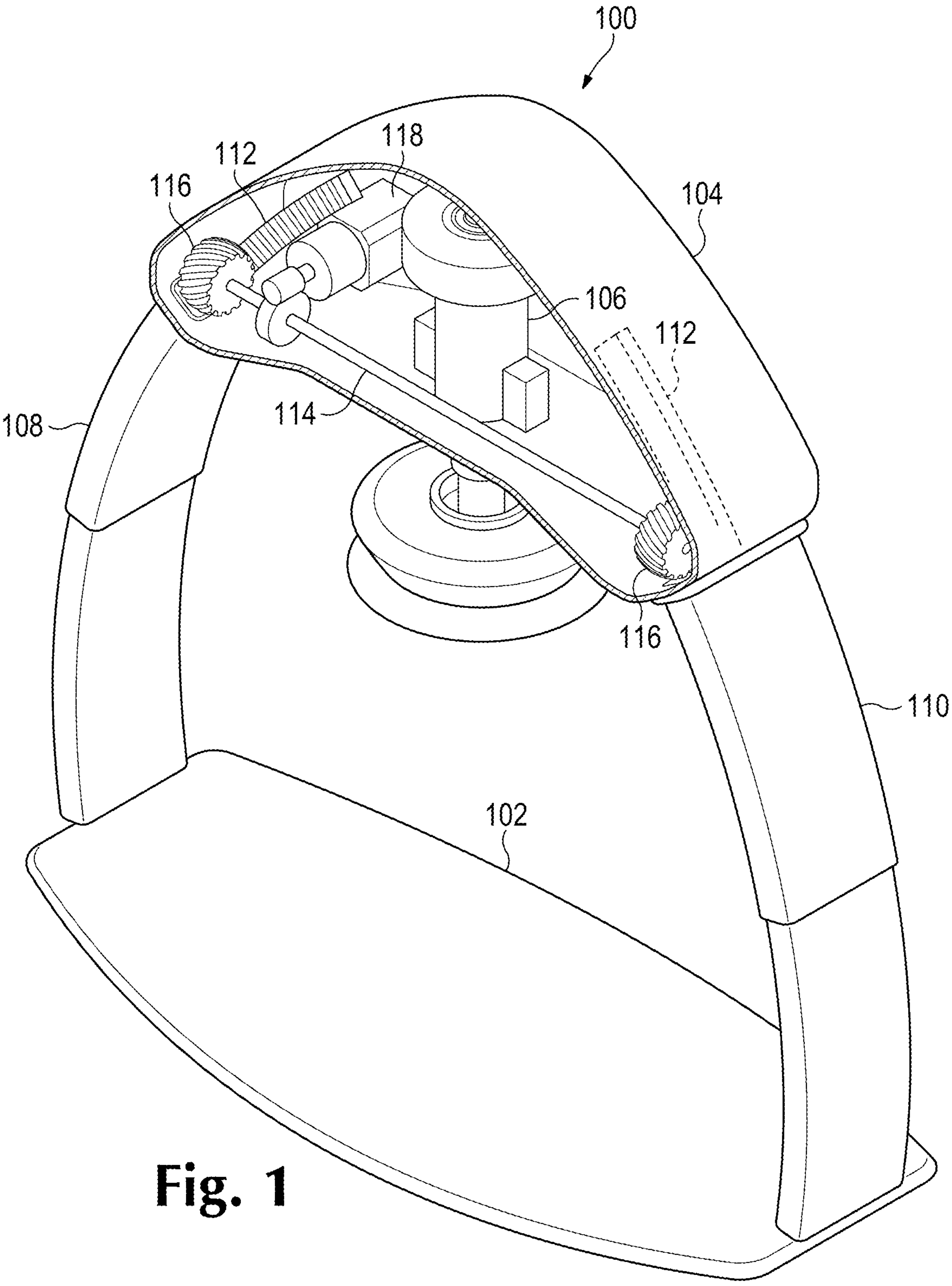
FIG. 1 illustrates a cut-away view of a chest compression device having adjustable legs according to some examples of the disclosure.

FIG. 1 illustrates a cut away view of an adjustable mechanical chest compression device 100 according to some examples of the disclosure. The chest compression device 100 includes a base member 102, which may also be referred to herein as a back plate. The base member 102 is structured to be positioned or placed underneath a back of a patient. The chest compression device 100 also includes a housing 104 that includes a chest compression mechanism 106. The housing 104 is structured to be positioned above the chest of the patient by two adjustable legs 108 and 110.

At least one of the legs 108 and 110 may be removably attached to the base member 102. The legs 108 and 110 may either be fixed or rotate relative to the housing 104. The legs 108 and 110 are adjustable to be longer or shorter as required by a patient size. For example, as shown in FIG. 1, legs 108 and 110 may be telescopic legs such that the legs may be extended or retracted to accommodate different sized patients.

Figure 2:
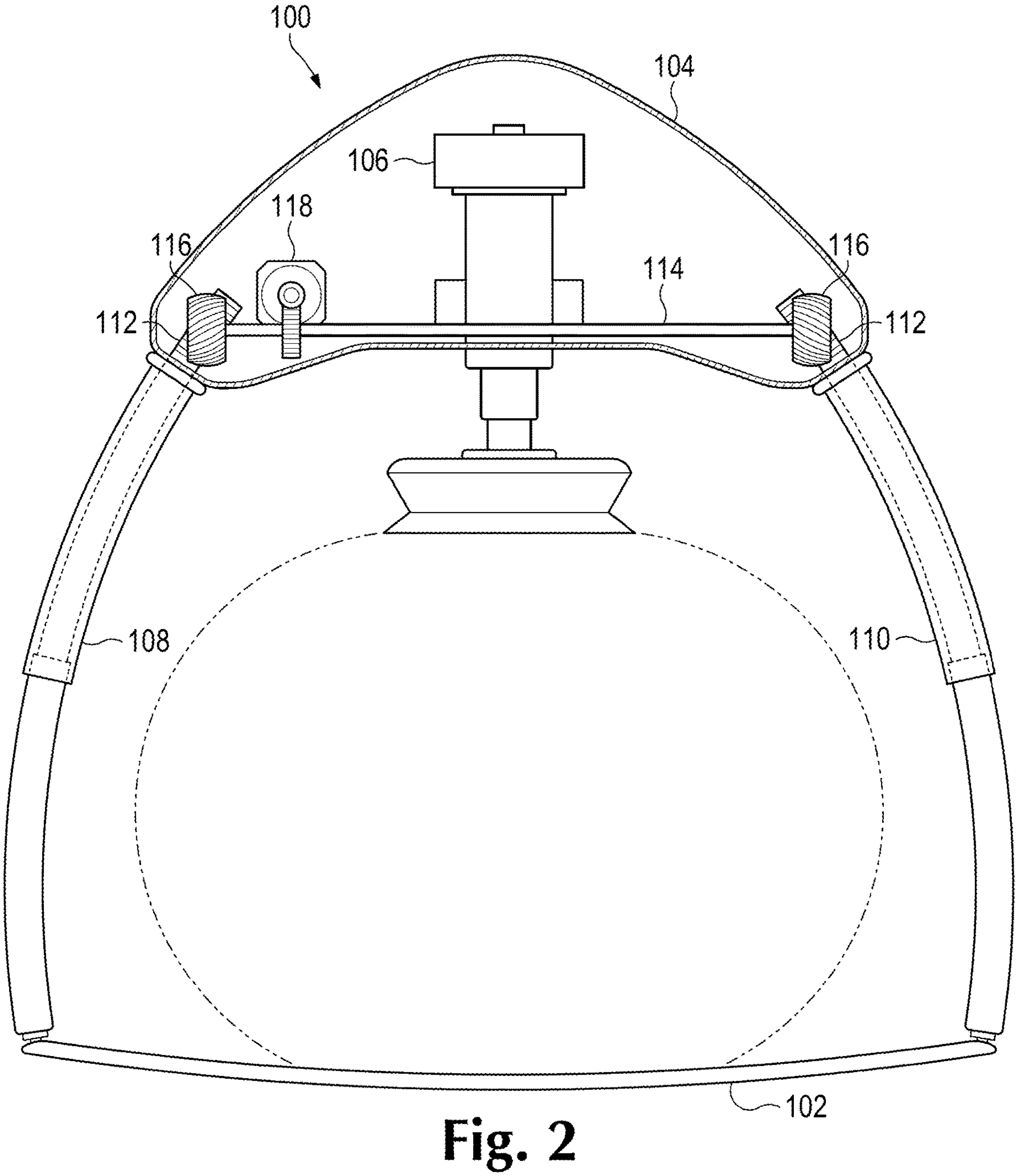
FIG. 2 illustrates a cut-away view of the chest compression device of FIG. 1 in an extended position.
Figure 3:
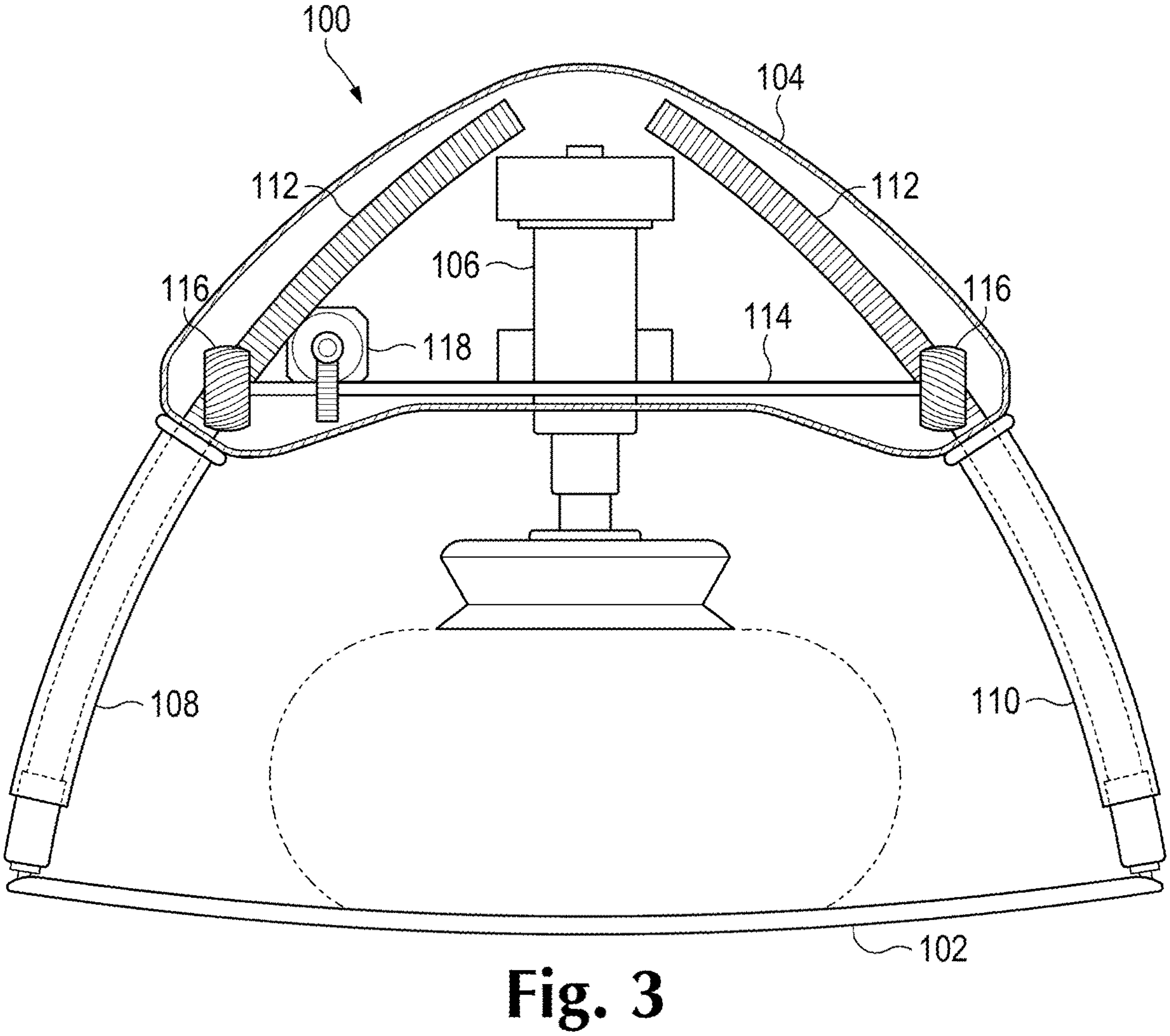
FIG. 3 illustrates a cut-away view of the chest compression device of FIG. 1 in a retracted position.

The legs 108 and 110 each include a mechanical or electromechanical mechanism for extending or retracting the legs 108 and 110. FIGS. 1-3 illustrate telescoping legs 108 and 110 that can include a cog rod 112 which interacts with a gear 116 connected to a shaft 114. Each cog rod 112 may be fixed to its respective leg 108 or 110. The shaft 114 may be a common shaft having a cog wheel 116, or any other mechanical connection means, on each of the shaft 114 to drive the cog rod 112. The common shaft 114 ensures that the legs 108 and 110 are adjustable simultaneously and remain an identical length to prevent the chest compression mechanism 106 from being off center and not operating properly. That is, the common shaft 114 ensures that the chest compression device 100 is kept stable before adjustment, through the adjustment procedure, and after adjustment is completed by keeping the length of the two legs 108 and 110 identical.

Examples of the disclosure, however, are not limited to a common shaft 114. Rather, the cog rods 112 may each be driven by individual drive mechanisms. This can allow one leg 108 or 110 to be extracted or retracted at a time. The drive mechanisms may communicate with each other to ensure that the legs 108 and 110 are the same length during operation of the chest compression device 100.

The cog rods 112 may be the same general shape as the legs 108 and 110. For example, if the legs are curved or bent, like shown in FIG. 1, then the cog rods 112 may also be bent or curved. If they legs 108 and 110 are straight, the cog rods 112 may be straight as well. A user may then extend or retract the legs 108 and 110 to adjust the height of the chest compression device 100 as needed. The legs 108 and 110 can include a lower portion which can be extended from or retracted into a sleeve of the legs 108 and 110.

In some examples, an electrical drive or controller 118 may be connected to the common shaft 114 to assist with extending or retracting the legs 108 and 110. A user interface (not shown) may be provided, such as a button or display, to adjust the legs 108 and 110. That is, the user may select the height desired for the legs 108 and 110 and the drive 118 may automatically adjust the heights by rotating the shaft a particular direction and amount based on predetermined settings. In other examples, the user may not select a particular height, but may rather just select a button or other input on the display until the legs 108 and 110 are at a desired height. In yet further examples, the suction cup may include a sensor to indicate when the suction cup is attached to a chest of a patient, and the sensor can send a signal to the electrical drive or controller 118 to stop adjustment of the legs.

Although a cog rod 112 and gears 116 are shown as the mechanical connection mechanism for extracting and retracting the legs 108 and 110, examples of the disclosure are not limited to this configuration. For example, any mechanical connection mechanism may be used to extend or retract the legs 108 and 110, such as, but not limited to, a spring pin latch, an electromagnetic connection, or any other mechanical connection mechanism for extending and retracting a portion of the legs 108 and 110 to adjust the height of the chest compression device 100.

FIGS. 2 and 3 illustrate when the legs 108 and 110 of the chest compression device 100 are fully extended and when the telescoping legs 108 and 110 are fully retracted, respectively. For example, the legs 108 and 110 may be fully extended, as shown in FIG. 2, to accommodate a larger patient who has a larger sternum height. The legs 108 and 110 may be retracted, as needed, to accommodate a smaller patient with a smaller sternum height, as shown in FIG. 3. This can allow the chest compression mechanism 106 to be placed in the most optimal location for compressing the chest of a variety of differently sized patients. The chest compression device 100 can be set at any intermediate location between the legs 108 and 110 fully extended and the legs 108 and 110 fully retracted.

Figure 4:
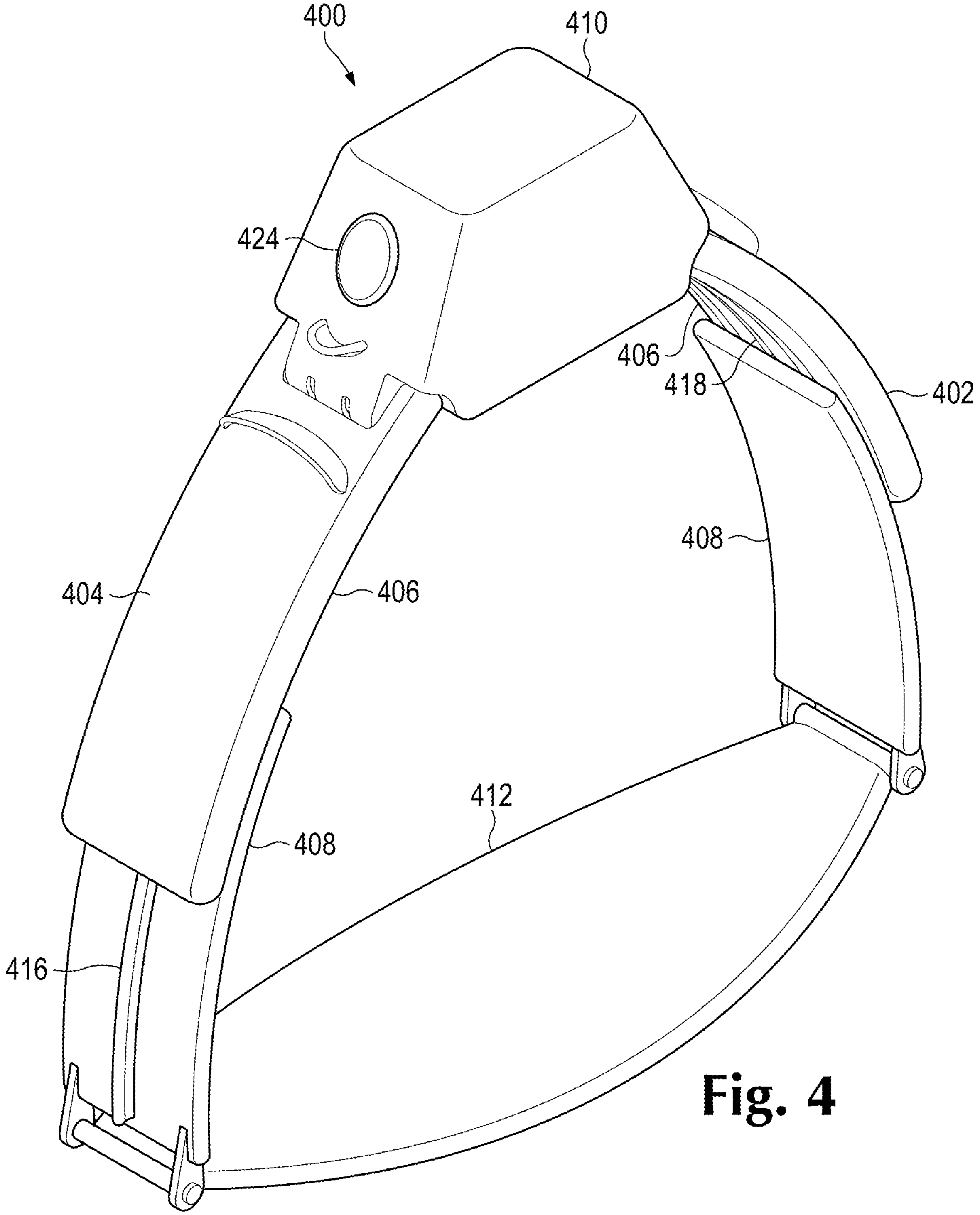
FIG. 4 illustrates another chest compression device having adjustable legs according to other examples of the disclosure.
Figure 5:
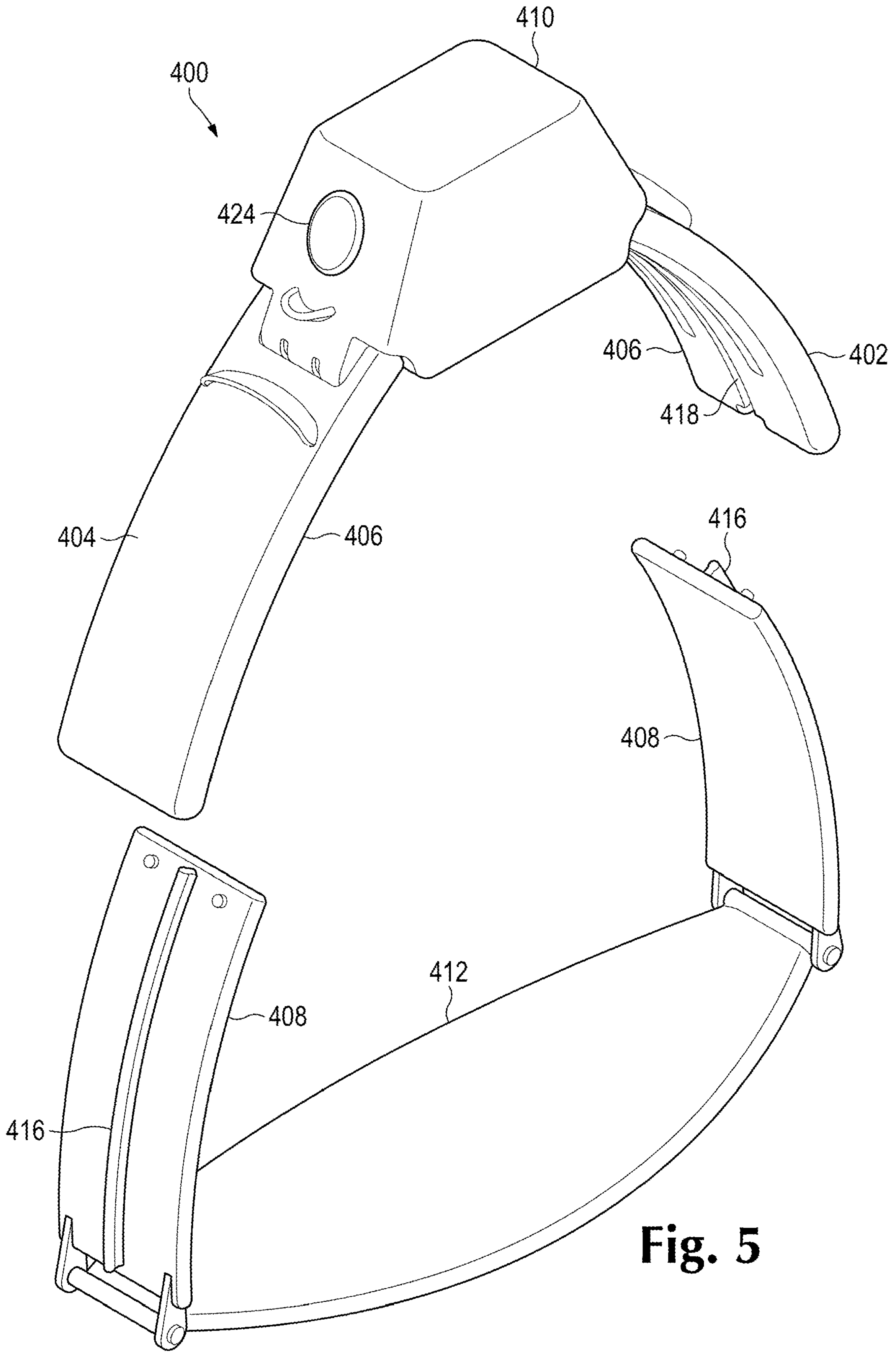
FIG. 5 illustrates the chest compression device of FIG. 4 with overlapping legs detached.

FIGS. 4 and 5 illustrates another example of a chest compression device 400 having adjustable legs. Rather than having telescoping legs with a leg portion that extends or retracts from a sleeve, as discussed above with respect to FIGS. 1-3, in some examples the chest compression device 400 may have overlapping support legs 402 and 404. Each overlapping support leg 402 and 404 may have an outer support leg 406 and an inner support leg 408.

In FIGS. 4 and 5, the outer support leg 406 is coupled or attached to a housing 410 for a chest compression mechanism. For ease of illustration, FIGS. 4 and 5 do not show the chest compression mechanism, but the chest compression mechanism may be similar to that shown above with respect to FIGS. 1-3.

The inner support leg 408 can be coupled or attached to a back plate 412, which is structured to be placed underneath a patient. Similar to FIGS. 1-3, the overlapping support legs 402 and 404 support the chest compression mechanism in the housing 410 over the chest of a patient. Although FIGS. 4 and 5 show the outer support leg 406 coupled to the housing 410 and the inner support leg 406 coupled to the back plate 412, examples of the disclosure are not limited to this configuration. In other examples, the outer support leg 408 may be attached to the housing 410, while the inner support leg 406 may be attached to the back plate 412.

The overlapping support legs 402 and 404 may include a connection mechanism for connecting the inner support leg 408 and the outer support leg 406 together to set the chest compression device 400 to a desired height for performing chest compression with the chest compression mechanism.

Figure 6:
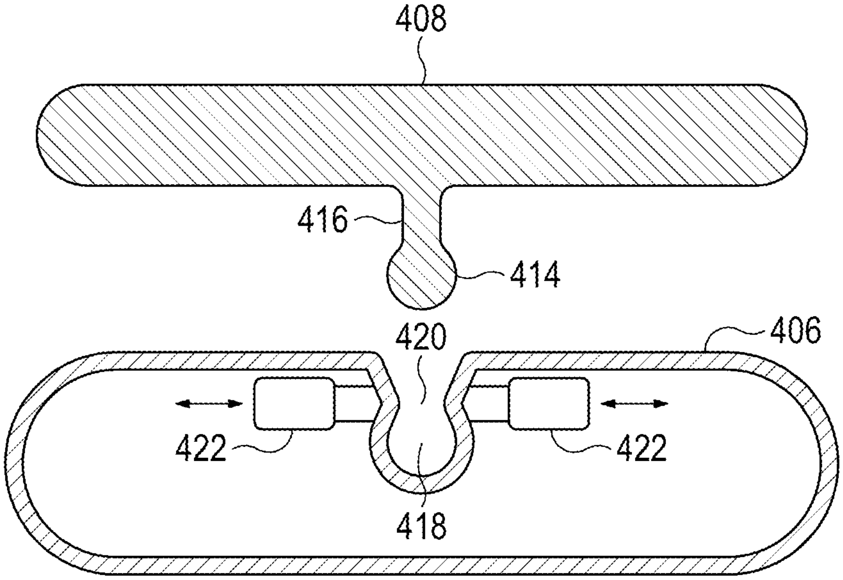
FIG. 6 illustrates an example of a connection mechanism for connecting the overlapping legs of the chest compression device of FIGS. 4 and 5.

For example, illustrated in FIGS. 4-6 is a zipper mechanism, with the inner support leg 408 including at least one protrusion having a head 414 wider than a stem 416 on the outer surface of the inner support leg 408. Conversely, the outer support leg 406 includes a recess 418 structured to receive the head 414 and stem 416 to lock the outer overlapping support leg 408 and the inner locking support leg 410 in position. The recess 418 may include a narrow portion 420 to keep the head 414 of the protrusion on the inner support leg 408 locked into the recess 418. The narrow portion 420 of the recess 418 may be widened by a release mechanism 422 when a button 424 is pressed and the head 414 may then be released from the recess 418 to disconnect the outer support leg 406 and the inner support leg 408.

To assist the overlapping support legs 402 and 404 to have an identical length, a sensor may be placed on the legs to sense the length of each leg 402 and 404. The chest compression device 400 may include a user interface to output or alert a user to the length of each overlapping support leg 402 and 404. This can help ensure that the overlapping support legs 402 and 404 remain the same length to keep the chest compression device 400 stable during operation.

In some examples, a sensor may be provided on the housing 410 to indicate whether the housing is in a position which indicates that the overlapping support legs 402 and 404 are at the same length. For example, the sensor on the housing 410 may detect whether the housing 410 is slanted or titled to one side, indicating that the overlapping support leg on the lower side of the housing 410 is shorter than the other overlapping support leg.

Further, although FIGS. 4-6 illustrate a zipper mechanism for locking the overlapping support legs 402 and 404, other connection mechanism may be used, such a spring pin latch, where one of the inner support leg 408 or the outer support leg 406 has one or more spring pins and the other has a plurality of holes to receive the spring pin to set the length. In some examples, an electromagnet may be used to lock the outer support leg 406 and inner support leg 408 together and then released by a release mechanism, such as button 424, by reversing the magnet. Any mechanical connection mechanism can be used to connect the outer support leg 406 and the inner support leg 408 so that a variety of patient sizes can be accommodated in the chest compression device 400.

In conventional mechanical chest compression devices, legs for supporting the chest compression mechanism are connected to a main housing by hinges. The legs have two positions, an inner position for folding the device for storage and transportation and an outer position for operation of the chest compression mechanism, but the legs do not lock in either of the positions. Some examples of the disclosure, as shown in FIGS. 7-15, for example, allow for the legs to be locked in the inner position, the outer position, and one or more intermediate positions. Legs with multiple locking positions can allow the device, when in operation, to accommodate patients of different sizes. For example, when the legs are locked in the outer most position, the chest compression mechanism can accommodate a smaller patient by being closer to the chest of the smaller patient. Alternatively, when being used on a larger patient with a larger sternum height, the legs can be locked in one of the intermediate positions to position the chest compression device higher and above the chest of a larger patient.

Figure 7:
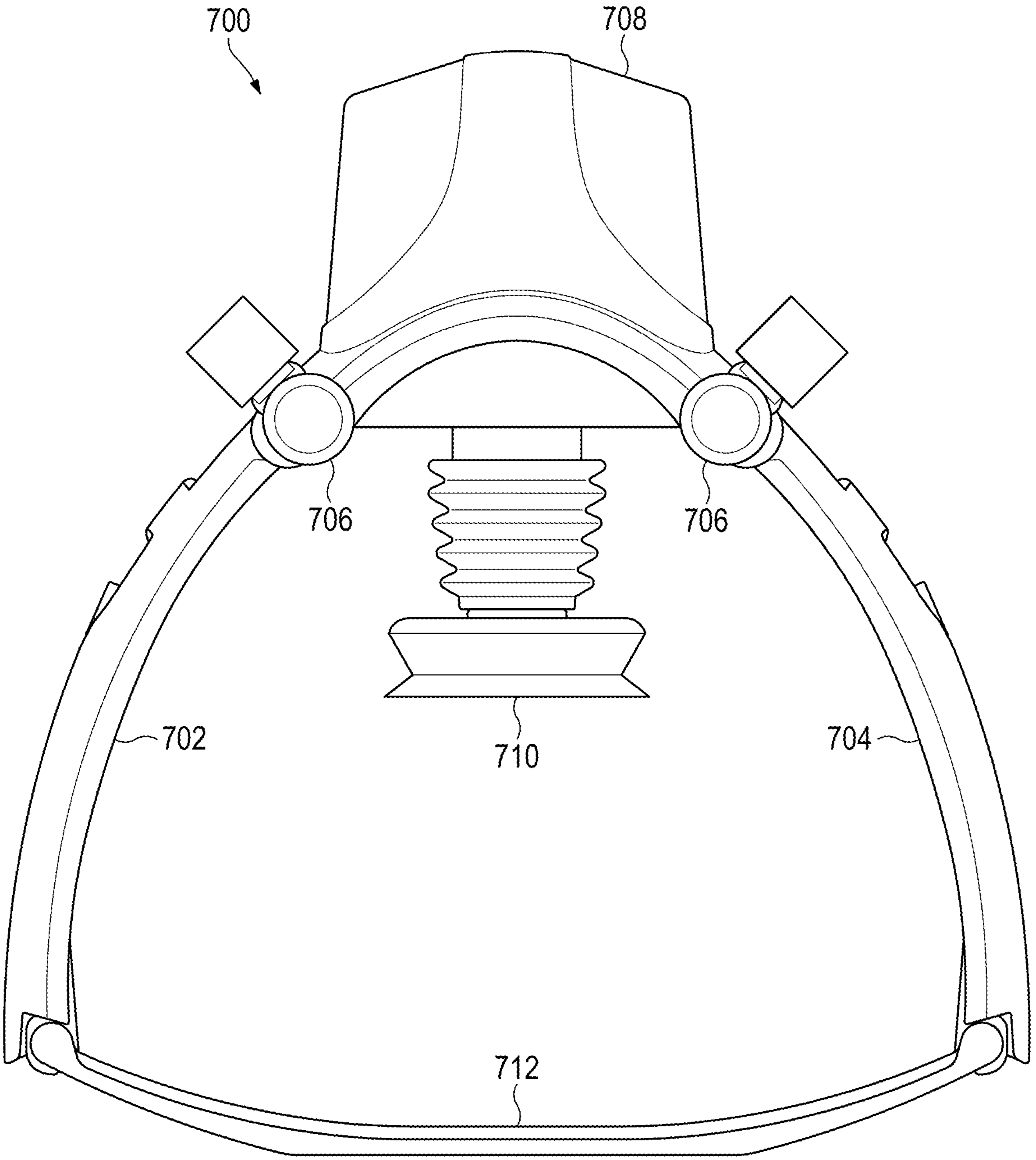
FIG. 7 illustrates another example of a chest compression device having adjustable legs according to other examples of the disclosure.

FIG. 7 illustrates an example of a chest compression device 700 having rotatable legs 702 and 704 about hinges 706. Similar to other examples discussed above, the chest compression device 700 includes a main housing 708 having a chest compression mechanism 710 and a back plate 712 to connect to the legs 702 and 704.

As will be discussed in more detail below, the legs 702 and 704 may be adjustable between an outer position, as illustrated in FIG. 7, an inner position, and one or more intermediary positions.

Figure 8:
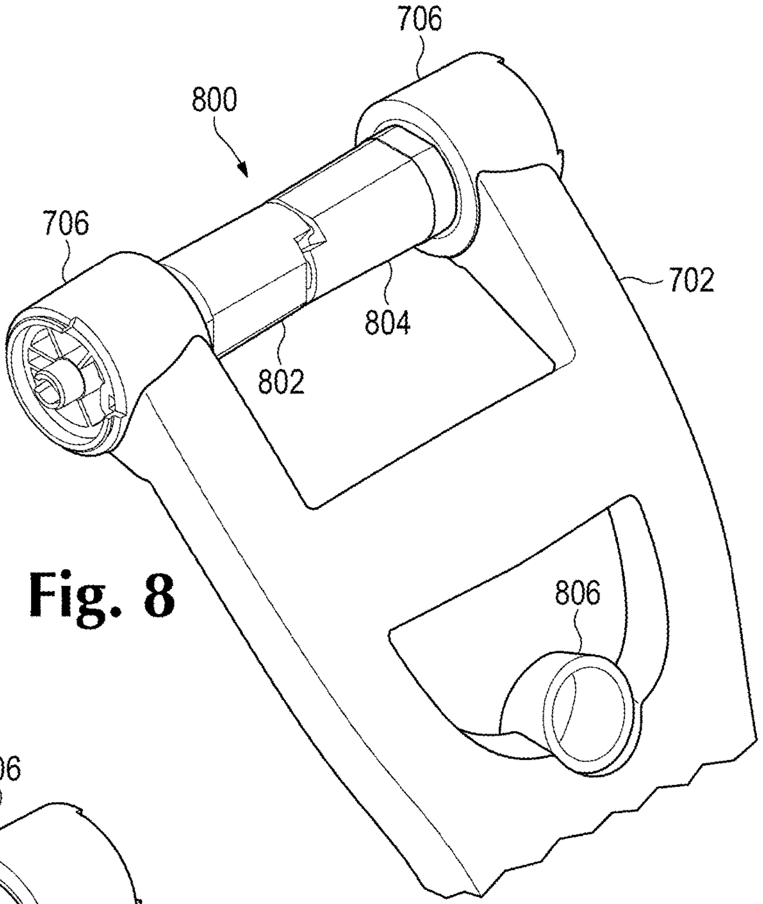
FIG. 8 is a side view of a portion of a leg of the chest compression device of FIG. 7.

FIG. 8 illustrates a front view of leg 702, for example. Leg 704 may be structured in the same manner as leg 702. The leg 702 includes an axel 800 that connects between the hinges 706 and a release ring 802. The axel 800 includes a locked axel 802 that is locked to the hinge 706 and a free moving axel 804 that spins freely in the hinge 706.

Figure 9:
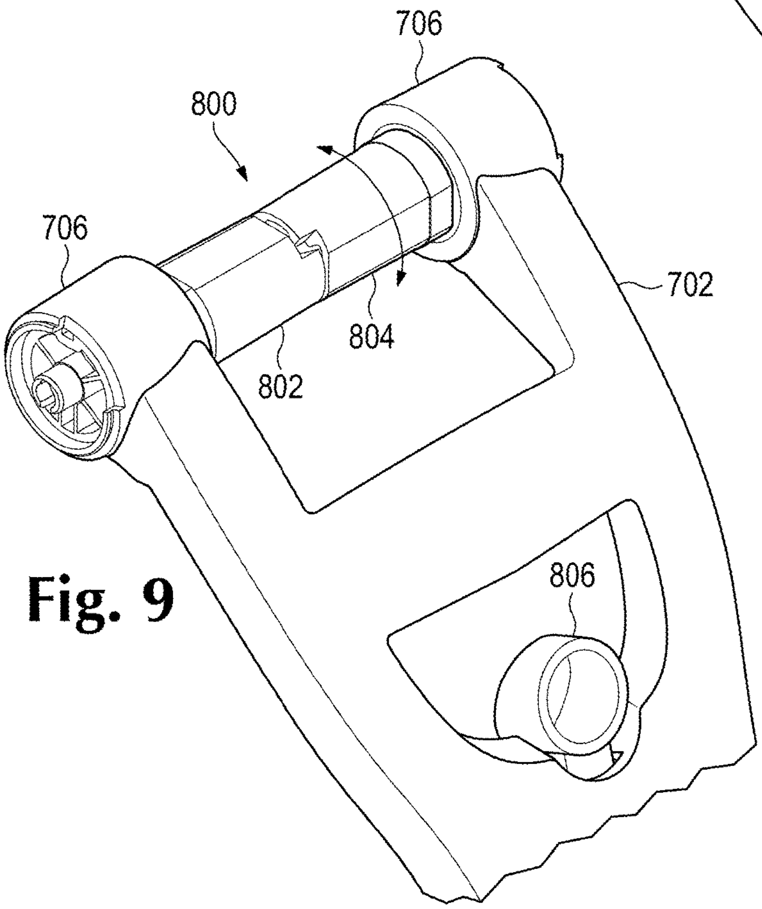
FIG. 9 is a side view of a portion of a leg of the chest compression device of FIG. 7 with a release ring engaged.

The locked axel 802 and the free moving axel 804 include a lock that locks the axels together to prevent the leg from moving either in the inner most position or outer most position, which results in the legs 702 and 704 being rigid and locked to the main housing 708, which can allow a user to connect one leg 702 to the back plate 712 and flip the chest compression device 700 over to connect the other leg 704 to the back plate 712. FIG. 8 illustrates the free moving axel 804 locked to the locked axel 802, while FIG. 9 illustrates the free moving axel 804 unlocked from the locked axel 802 to allow rotation of the leg 702.

Figure 10:
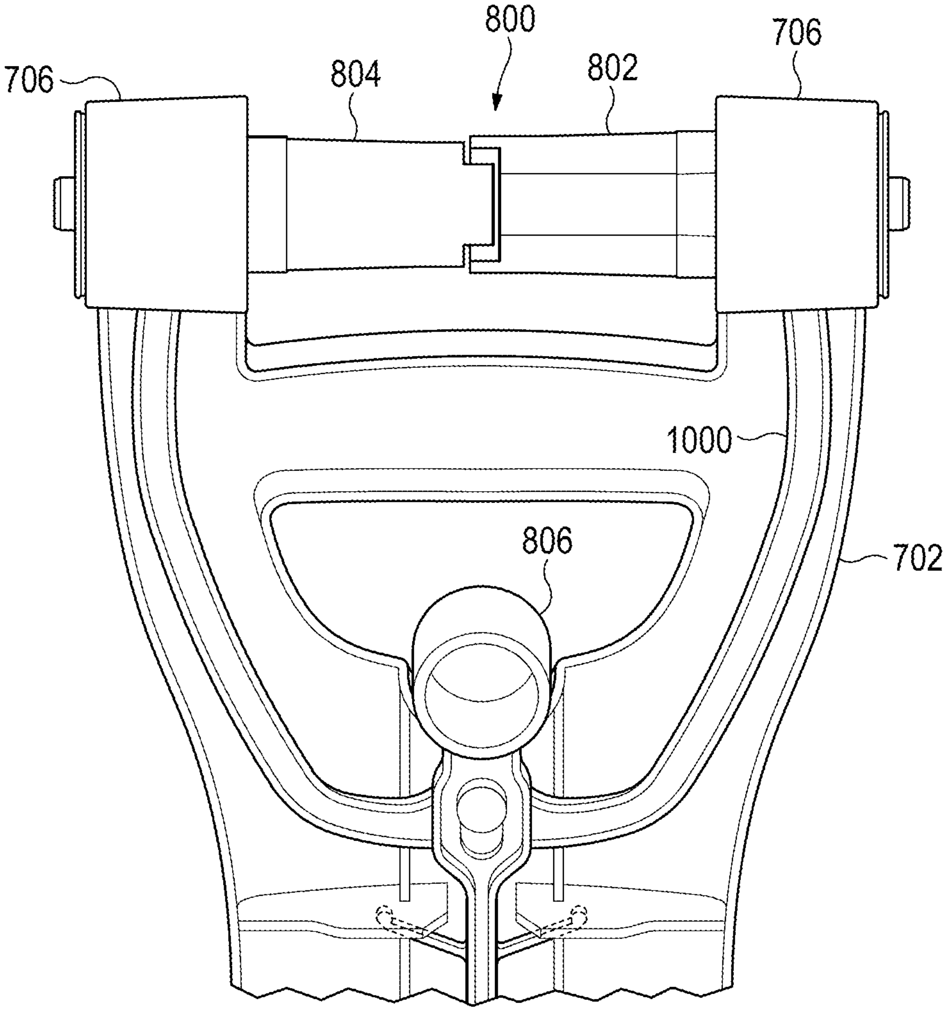
FIG. 10 is a cross section view of the leg of FIG. 8.

FIG. 10 illustrates a cross-section view of the leg 702 to illustrate the release mechanism for the lock in the free moving axel 804. When the release ring 806 is pulled upwards, the arm 1000 moves upward to cause an internal spring of the free moving axel 804 to move away from and disengage with the locked axel 802, as illustrated in more detail in FIG. 11.

Figure 11:
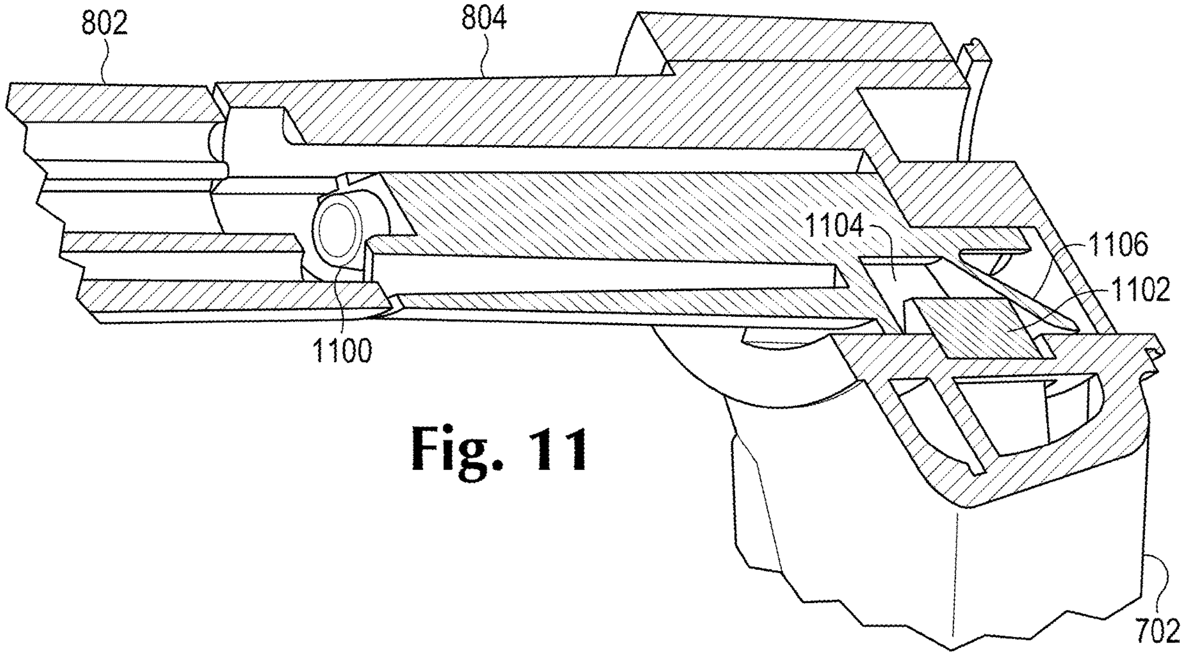
FIG. 11 is a cross section view of the shaft of the leg of FIG. 8 with the shaft unlocked.

FIG. 11 illustrates a cross-section view of a portion of the axel 800, including a portion of the locked axel 802 and the free moving axel 804. The free moving axel 804 includes a plunger 1100 which may have an internal spring. When the release ring 806 is pulled upwards to move the arm 1000 upwards, a top portion of the arm 1102 protrude through an opening 1104 and compresses a protrusion 1106 on the plunger 1100 which causes the plunger 1100 to move away from the locked axel 802 to unlock the locked axel 802 and the free moving axel 804.

Figure 12:
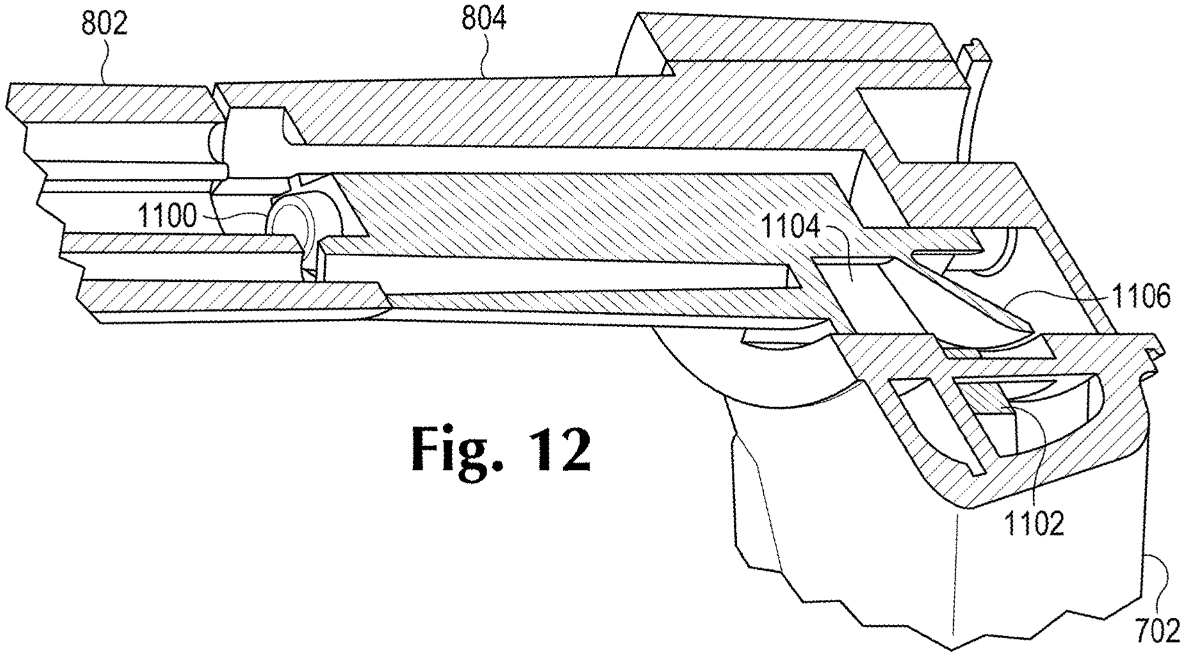
FIG. 12 is a cross section view of the shaft of the leg of FIG. 8 with the shaft locked.

FIG. 12, on the other hand, illustrates when the release ring 806 is not engaged, that is, when the release ring is not in the upwards position. The arm 1102 is retracted and the plunger 1100 protrudes into the locked axel 802 to lock the locked axel 802 and the free moving axel 804 together to prevent movement of the legs when in the outer most or inner most position.

Figure 13:
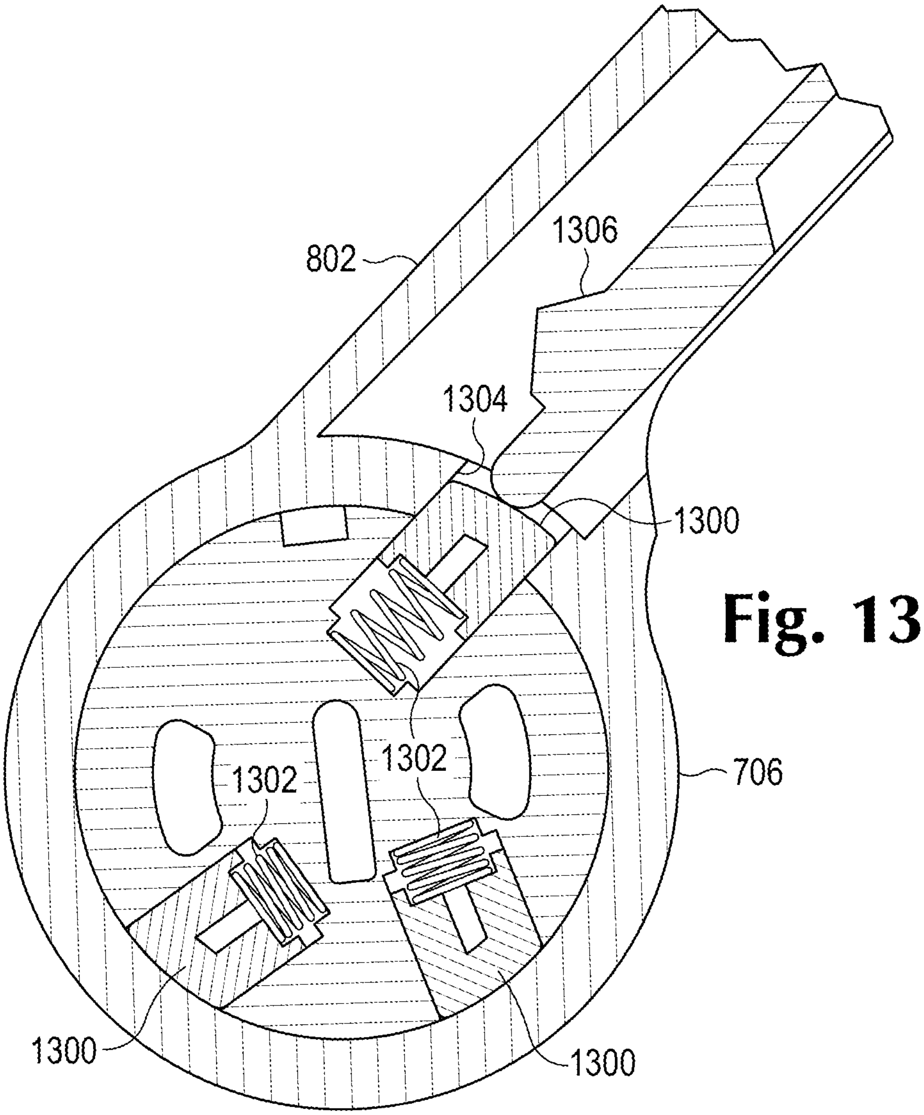
FIG. 13 is a cross section view of a hinge of the leg of FIG. 8 with an axel locked to the hinge.

FIG. 13 illustrates an example of the hinge 706 for the locked axel 802 to set the leg 702 in any number of intermediate positions to accommodate different patient sizes. The hinge 706 may contain a number of different plungers 1300 and springs 1302 to engage with the locked axel 802 and lock the locked axel 802 to the hinge 706. Although three plungers 1300 and springs 1302 are illustrated in FIG. 13, any number of plungers may be provided to lock the 702 in a variety of positions to accommodate patients of different sizes. The hinge 706 includes an opening 1304 to receive one of the plunger 1300 and lock the locked axel 802 in that position.

Figure 14:
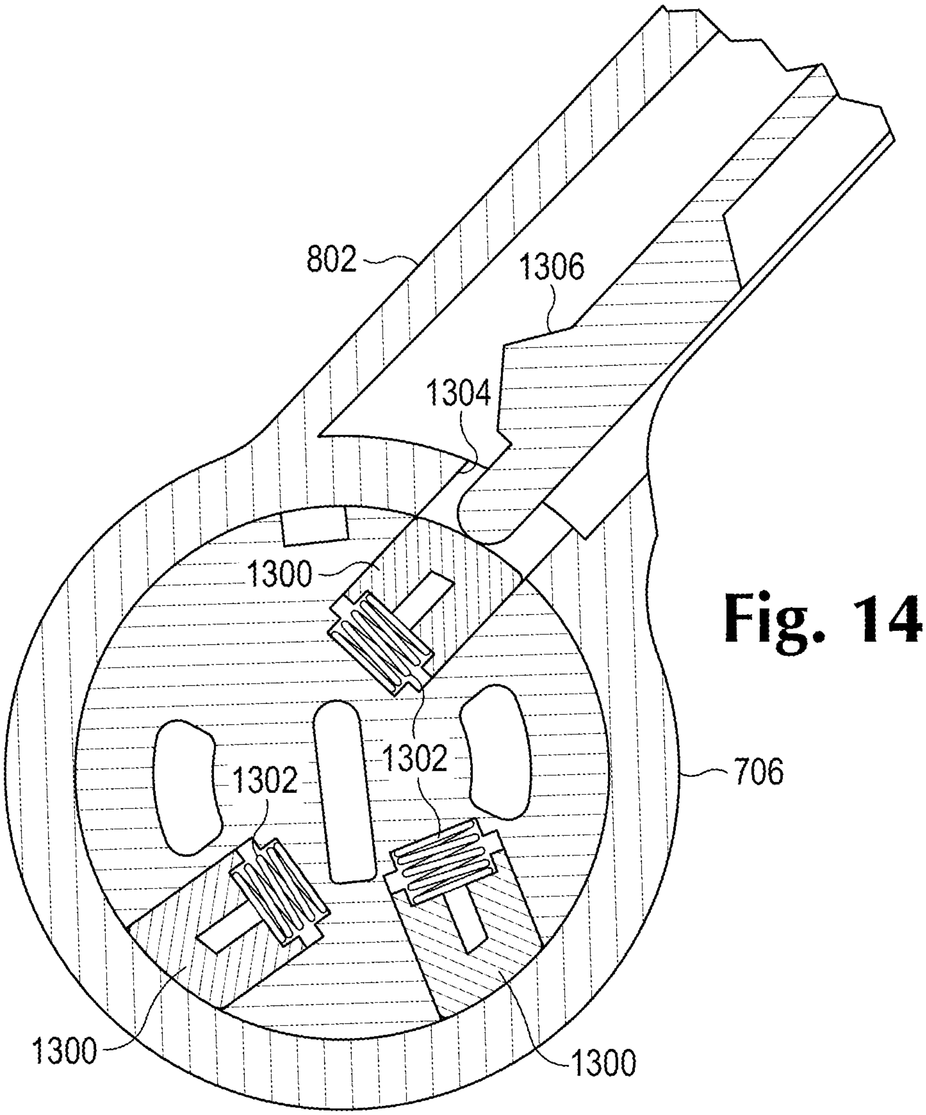
FIG. 14 is a cross section view of a hinge of the leg of FIG. 8 with the axel unlocked to the hinge.
Figure 15:
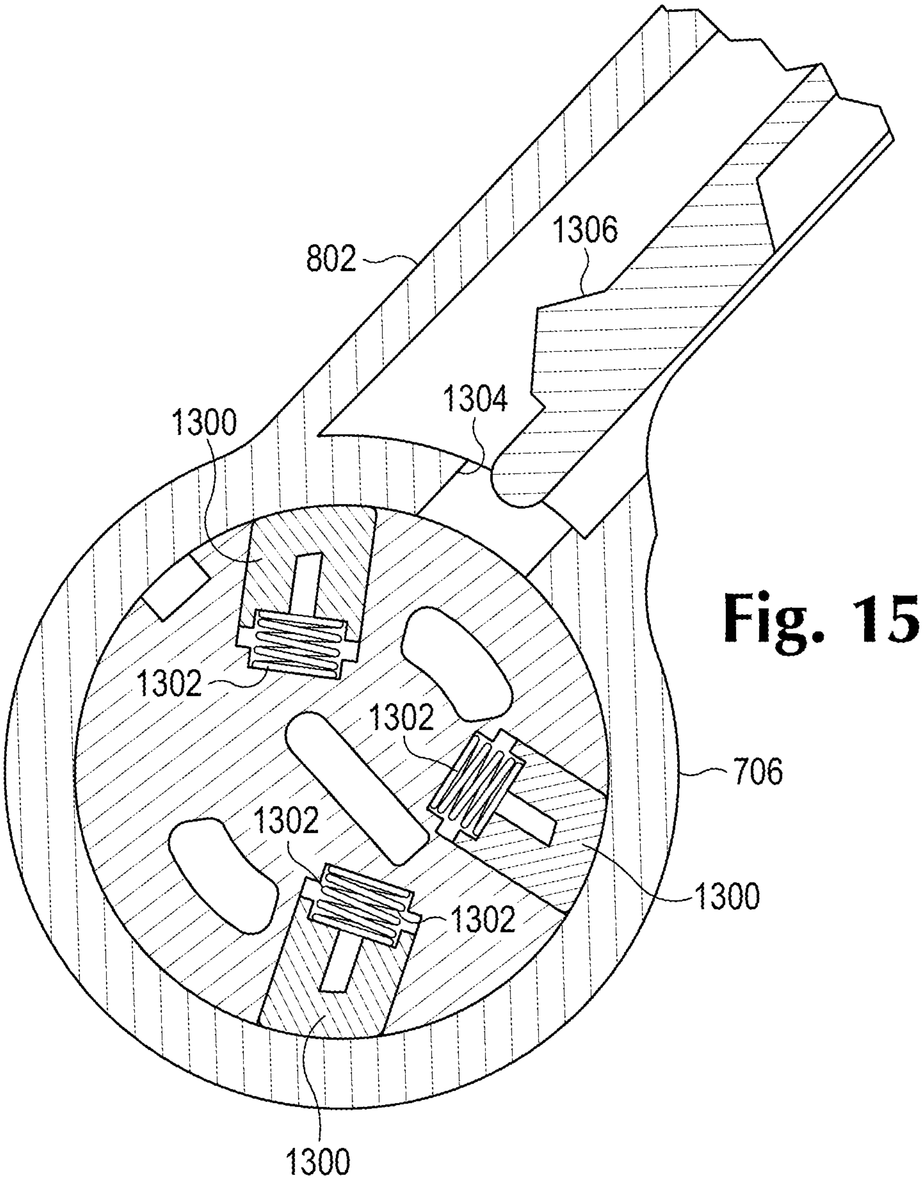
FIG. 15 is a cross section view of a hinge of the leg of FIG. 8 with the axel unlocked to the hinge.

The locked axel 802 can include an arm 1306 that can be pushed toward the hinge 706 to release the plunger 1300 to change the position of the leg. FIG. 14 illustrates the arm 1306 being engaged to push the plunger 1304 back into the hinge 706. The leg 702 can be rotated until the next plunger 1300 is received in the opening 1304. FIG. 15 illustrates when the leg is in the process of turning, and the leg can freely rotate until the next plunger 1300 is received in opening 1304.

In the examples illustrated in FIGS. 7-15, the legs 702 having multiple locking positions may also stabilize the chest compression device 700 to a back plate. As such, in some examples, the back leg may have outside shafts which require the legs 702 to be in their widest position, but a higher back plate shaft may be used to accommodate a larger patient size. As such, in some examples, the narrowest locking position may be used on smaller patients and the wider locking position may be used on larger patients when combined with a back plate.

Figure 16:
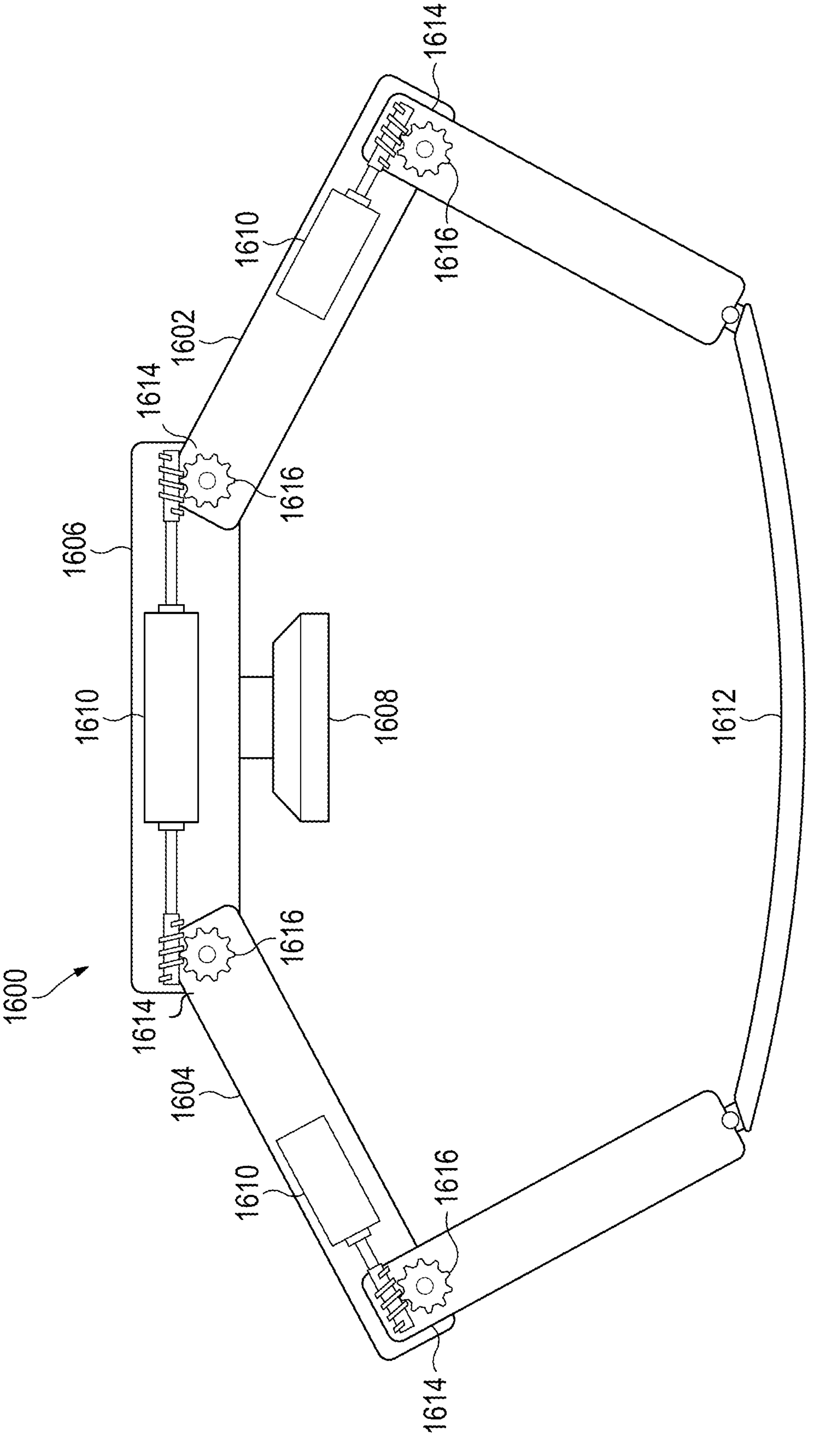
FIG. 16 is another example of a chest compression device with adjustable legs for compression a chest of a patient according to other examples of the disclosure.

FIG. 16 illustrates another example of a chest compression device 1600 that is adjustable to accommodate a variety of patient sizes. Additionally, the chest compression device 1600 provides a low profile and low center of mass which can be beneficial for flying ambulances.

The chest compression device 1600 includes motorized movable arms 1602 and 1604, which are joined by joints 1614 in a main housing 1606. The main housing 1606 includes a suction cup 1608 for compressing the chest of a patient. Although a suction cup 1608 is shown in FIG. 16, the compression device may attach to a chest of patient in a number of different way, such as with an adhesive, or may just abut a chest of a patient in some examples, rather than attaching. The chest compression device 1600 can also include motors or actuators 1610 to move the arms 1602 and 1604 simultaneously so that the suction cup 1608, which is placed on the patient's chest, moves up and down with respect to a back plate or base member 1612. The chest compression device 1600 may also include a controller or processor to control the arms 1602 and 1604 to compress the chest of a patient.

Each of the arms 1602 and 1604 include a joint 1614. In the chest compression device 1600 illustrated in FIG. 16, the motors 1610 in the joints 1614 interact with a gear 1616 to move the arms 1602 and 1604, while the motor 1610 in the main housing 1606 is positioned horizontally and interacts with gears 1616 in each of the arms 1602 and 1604 to assist with moving the arms 1602 and 1604 in unison to compress the chest of the patient. Each joint 1614 may have an angle sensor (not shown) to sense the angle of the arm and provide feedback to the motor and a connected processor.

Additionally, at the end of each arm 1602 and 1604, a lockable mechanism can be provided to allow the chest compression device 1600 to lock to the back plate 1612. Since the arms 1602 and 1604 have a joint 1614, the chest compression device 1600 can accommodate a variety of patient sizes by moving the main housing up or down as needed during chest compressions. Since the chest compression device 1600 does not have a movable piston, but is rather operated by the arms 1602 and 1604, and since the motor 1610 in the main housing 1606 is horizontal, a very low build height can be achieved, allowing the use of the chest compression device 1600 in ambulance helicopters or other locations with height restrictions. By placing the motor 1610 in the main housing 1606 in a horizontal position and adding the motors 1610 to the arms 1602 and 1604, the center of mass of the chest compression device 1600 can be shifted significantly towards the back plate 1612, which may waive mechanical tie-down during ambulance transport.

Although gears 1616 are illustrated in FIG. 16, examples of the disclosure are not limited to this configuration. Rather, other means of moving the arms 1602 and 1604 may be provided. For example, rather than having motors 1610 in each of the joints 1614, a motor 1610 in the chest compression device 1600 may connect to each joint 1614 through a wire, pulley, or wheels. In some examples, the motors 1610 may be hydraulic or pneumatic pistons, and may include hydraulic locking to secure parallel movement of the compression housing 1606 toward and away from a patient's torso.

In some examples, rather than have a single motor 1610 in the housing to control both arms 1602 and 1604, a separate motor 1610 may be provided to actuate each arm 1602 and 1604 separately and/or at different rates. Additionally, although not shown, additional actuators and sensors may be provided in the main housing 1606 and the arms 1602 and 1604 to adjust the chest compression device 1600 in a number of ways, such as moving the suction cup in a number of different directions, including left, right, backwards, and forwards. In some examples, actuators may also be included to tilt the suction cup in a plane orthogonal to FIG. 16.

Additionally, although not shown, the chest compression device 1600 may have a display or other type of user interface on the top surface for a user to interact with. The chest compression device 1600 can also include one or more processors, memory, and other electrical components for controlling the chest compression device 1600. The chest compression device 1600 may also have a compartment for a replaceable battery. In some examples, the suction cup may have force sensors, such as strain gauges, to measure the force of the compressions. The suction cup can also have a hollow channel for air evacuation by a small pump which may be located in the main housing 1606 to assist with securing the suction cup to the patient's chest during chest compressions. The main housing 1606 may be equipped in some examples with one or more sensors for sensing the patient's chest, such as, but not limited to, the detection of breathing or a heartbeat.

Figure 17:
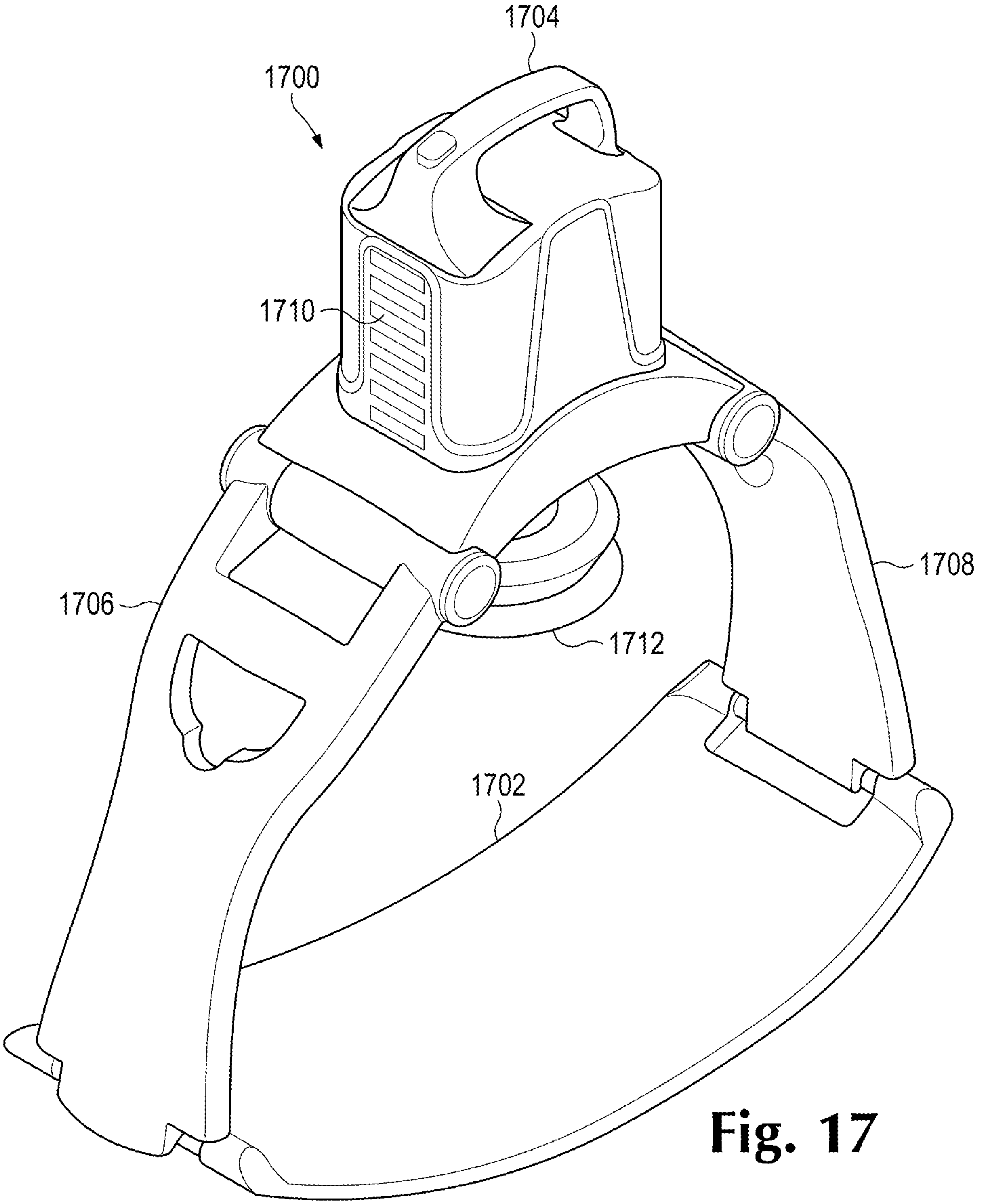
FIGS. 17 and 18 are an example of a chest compression device with an adjustable hood according to some examples of the disclosure.
Figure 18:
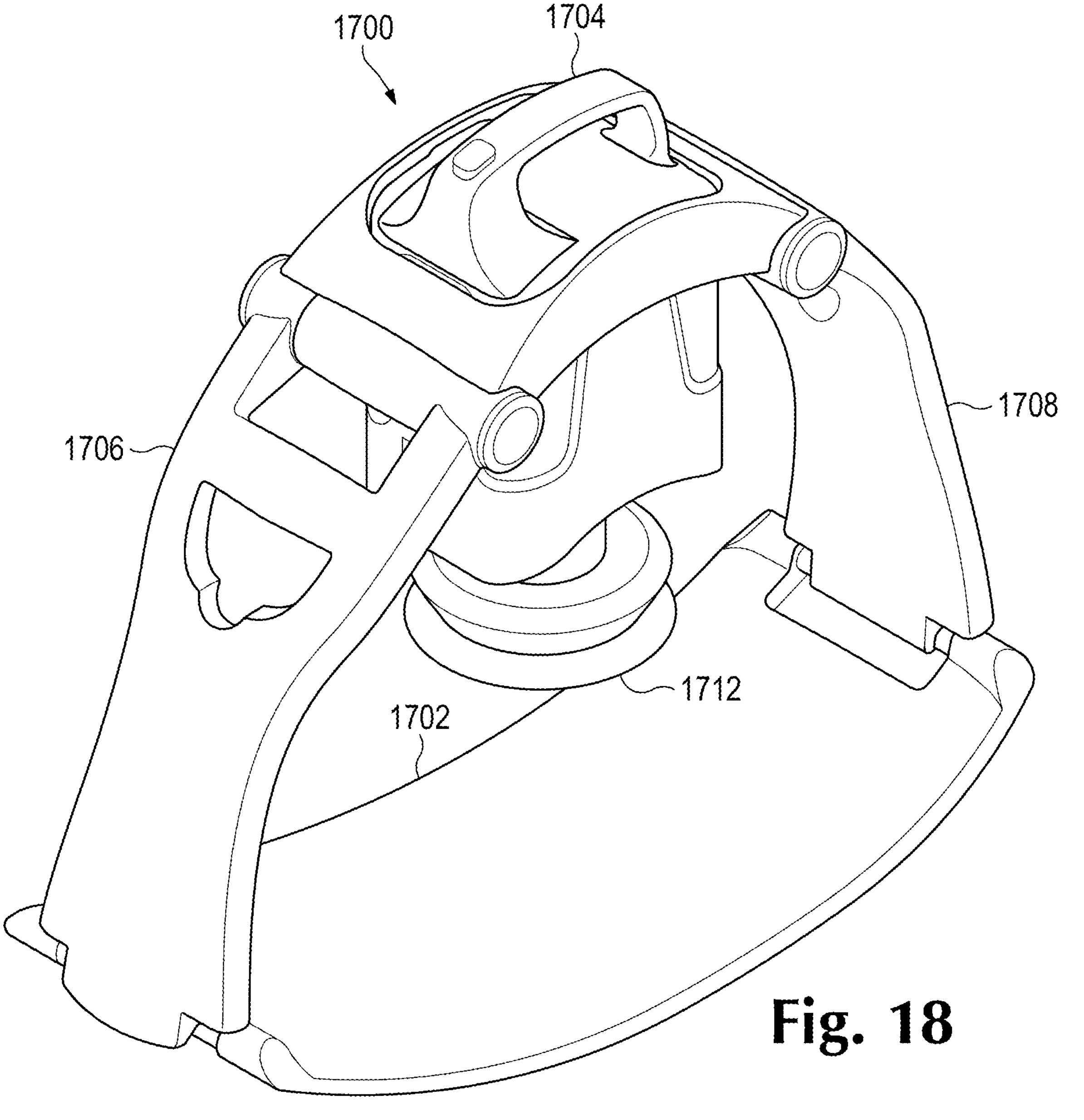

During operation, the processor or controller in the chest compression device 1600 can instruct the various motors to operate to set the arms 1602 and 1604 in a desired position for the size of the patient, and further instruct the arms to move to cause the chest compressions to be performed on the patient. That is, the arms 1602 and 1604 can move up and down to compress the chest of the patient through the suction cup 1608 in the main housing 1606. In some examples, rather than adjusting the legs to accommodate different patient sternum heights, a chest compression device 1700 may include an adjustable housing or hood, which can move relative to a back plate 1702, as illustrated in FIGS. 17 and 18. The chest compression device 1700 may include a main housing 1704 connected to two legs 1706 and 1708, which may or may not be adjustable, as discussed above.

The main housing 1704 may include any means to adjust the main housing 1704 relative to the back plate 1702. For example, the main housing 1704 includes an adjustment mechanism 1710 to adjust the main housing 1704 relative to the back plate 1702. The main housing 1704 also includes a chest compression mechanism, which can include a plunger 1712. The adjustment mechanism 1710 may include any mechanism to adjust the main housing 1704 and the chest compression mechanism relative to the back plate 1702. For example, the adjustment mechanism may be a mechanical or electromechanical adjustment mechanism. In some examples, the adjustment mechanism may include a rack and pinion mechanism, a spring latch mechanism, or may use gears and motors or actuators to adjust in a direction relative to the back plate 1702, or any combination of mechanical and electromechanical adjustment mechanisms.

Conventional chest compression devices include a mechanism to adjust a plunger down toward the chest of a smaller patient. This is often done using a ball screw. This configuration can result in the chest compression device being very top heavy when a smaller patient is receiving chest compressions, as the actual compression mechanism is much farther from the chest of the patient since the plunger has been extended to attach to the chest of the patient. Examples of the disclosure, as discussed above and shown in FIGS. 17 and 18, can have the entire main housing 1704, rather than just the plunger 1712, move toward the chest of the patient during CPR, resulting in the chest compression device 1700 not being too top heavy when compressing the chest of a smaller patient. In some examples, the plunger 1712 may still be able to extend out of the main housing 1704, but the main housing 1704 would still move closer to the chest of the patient as well. During transportation, the main housing 1704 may be placed in the lowest position to not take up as much space.

In some examples, the main housing 1704 can be adjusted in a direction perpendicular to the back plate 1702. For example, as illustrated in FIG. 17, when the main housing 1704 is in the highest position, the chest compression device 1700 may accommodate a larger patient with a larger chest height. When in the lowest position, as illustrated in FIG. 18, the chest compression device 1700 may accommodate a smaller patient by moving the main housing 1704 closer to the chest of the patient.

However, the main housing 1704 is not limited to moving only perpendicular to the back plate 1702, but may also adjust in several directions to provide the best placement on the patient's chest for CPR. That is, main housing 1704 may be tilted forward, backwards, or any other direction using the adjustment mechanism 1710 to provide the best placement of the plunger 1712 on the patient's chest for chest compressions during CPR.

Figure 19:
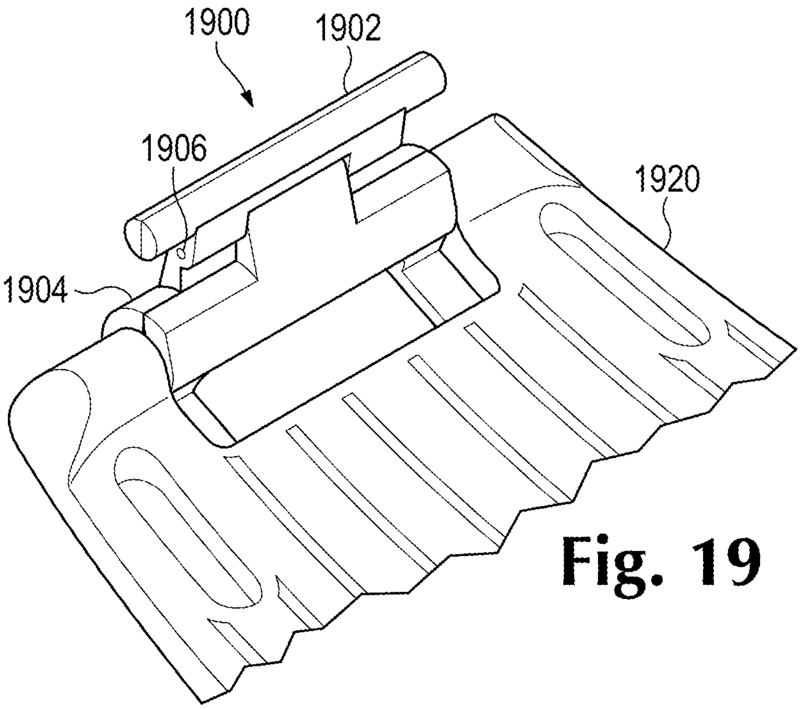
FIG. 19 is a back plate extension for a chest compression device according to some examples of the disclosure.
Figure 20:
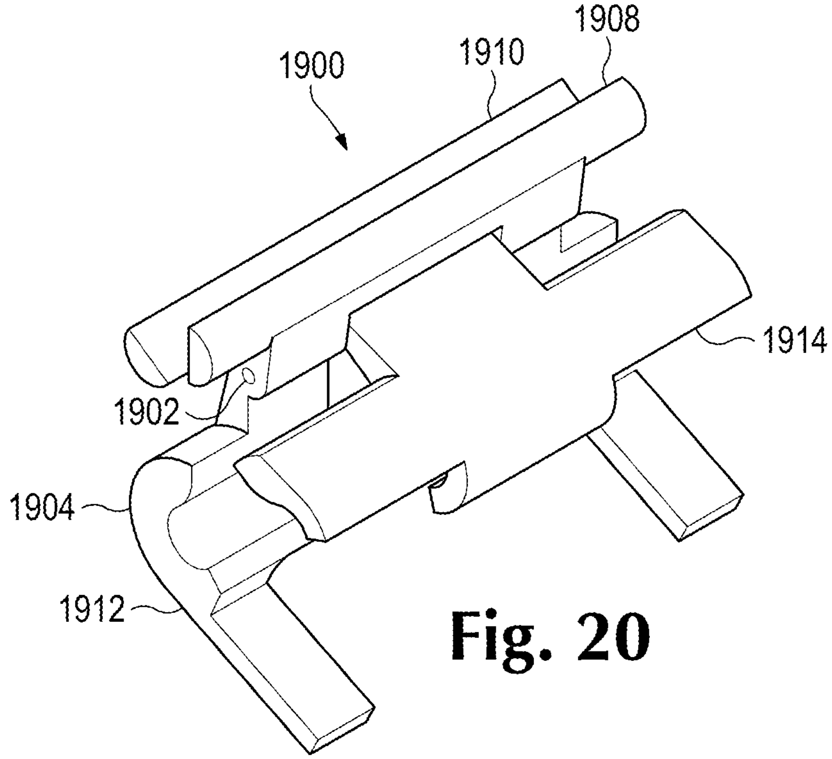
FIG. 20 is illustrates the back plate extension of FIG. 19 in an open position.

In some examples, rather than having an adjustable legs or hood, extensions may be provided to either the leg and/or the backboard to adjust the height and width of the chest compression device to accommodate a larger patient. FIGS. 19 and 20 illustrate an example of a back plate extension 1900 which may be used to raise the attachment shaft of a back plate 1920 to enable treating larger patients and/or patients with a larger sternum height. Although FIG. 19 illustrates only a single back plate extension 1900, a shaft locked on the other side of the back plate 1920 (not shown) would also include a back plate extension 1900.

The back plate extension 1900 can include an auxiliary shaft 1902 and a clamp 1904, as illustrated in FIGS. 19 and 20. Together, the auxiliary shaft 1902 and the clamp 1904 can form a scissor clamp that rotates about a joint 1906 to attach to the back plate shaft. The auxiliary shaft 1902 is composed of two parts or portions 1908 and 1910, that when abutted together form the auxiliary shaft 1902. The clamp 1904 also includes two parts 1912 and 1914 that when abutted together form the clamp 1904. The parts 1908 and 1912 may be formed of a single component and the parts 1910 and 1914 may also be formed of a single component.

When connected to the back plate shaft, the auxiliary shaft 1902 is straight above the existing shaft of the back plate and a connection of a leg of a chest compression device can connect to the back plate extension 1900 auxiliary shaft 1902, rather than the back plate 1920 itself, resulting in a greater space between the back plate 1920 and the chest compression device, so the device may be used on a patient having a larger sternum height. Portions of the clamp 1904 may abut against the back plate 1920 or the shaft of the back plate 1920 to prevent rotation of the back plate extension during operation of the chest compression device.

In some examples, a sensor may be added to the back plate extension 1900 which alerts to the chest compression device whether the extension has been added to the chest compression device.

Figure 21:
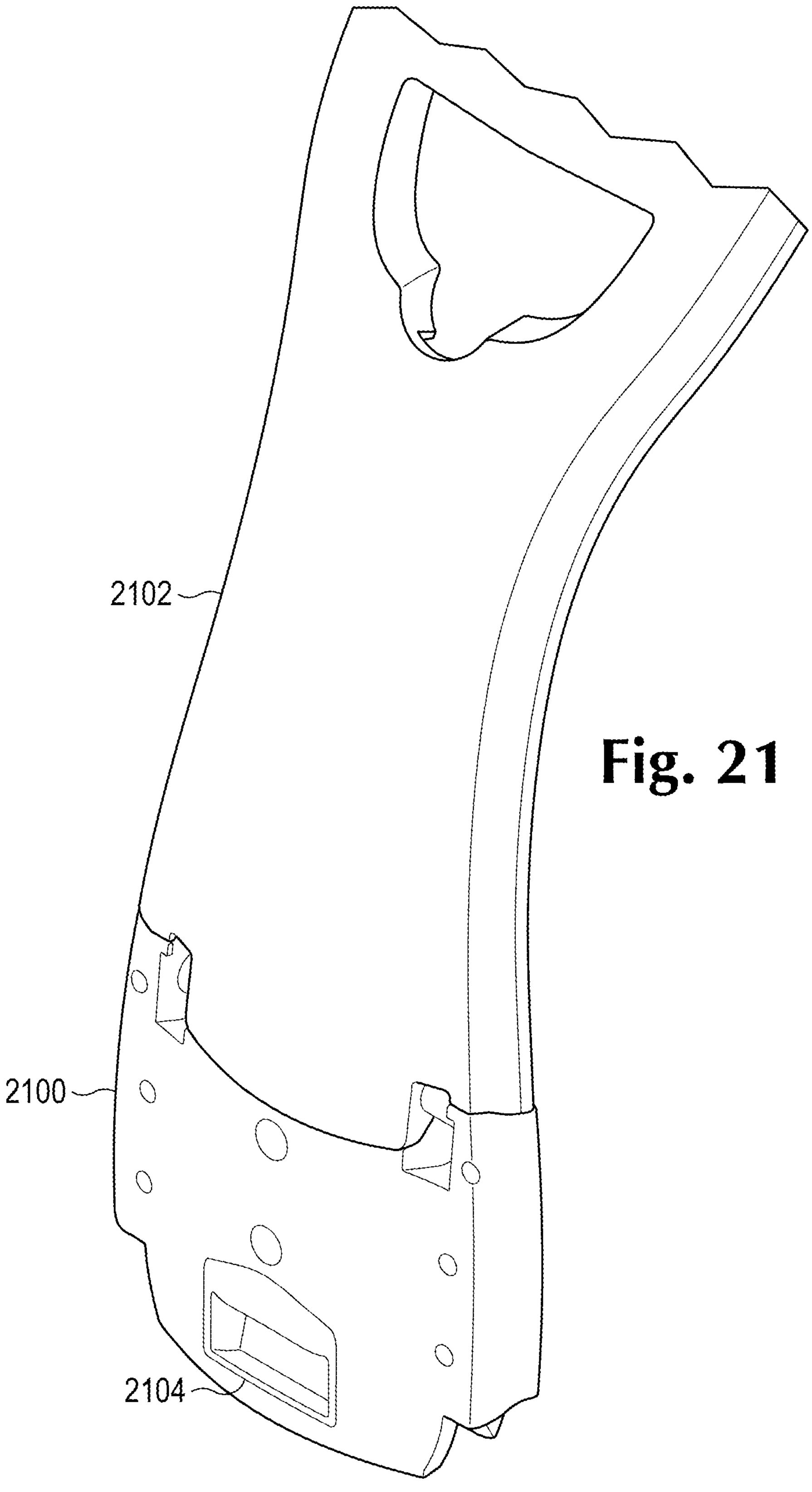
FIGS. 21 and 22 illustrate a leg extension for a chest compression device according to some examples of the disclosure.
Figure 22:
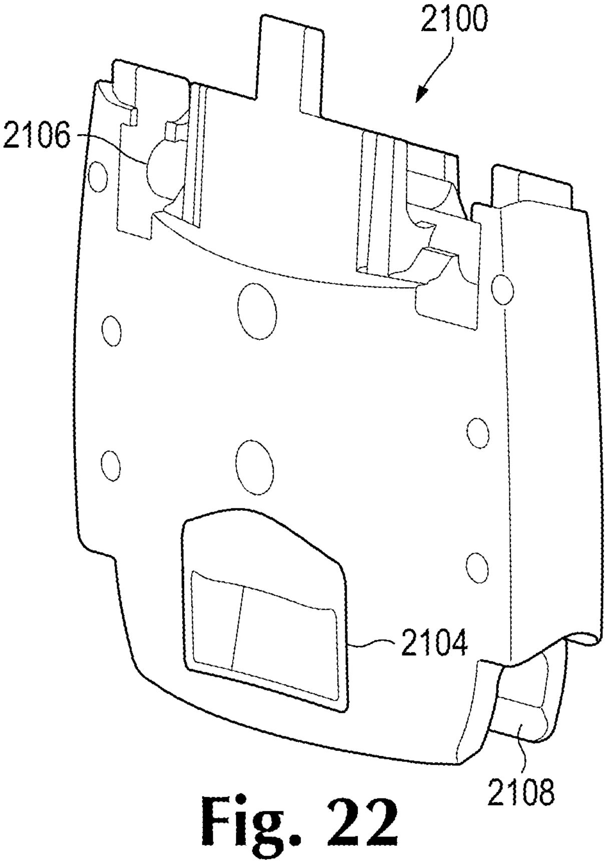
Figure 23:
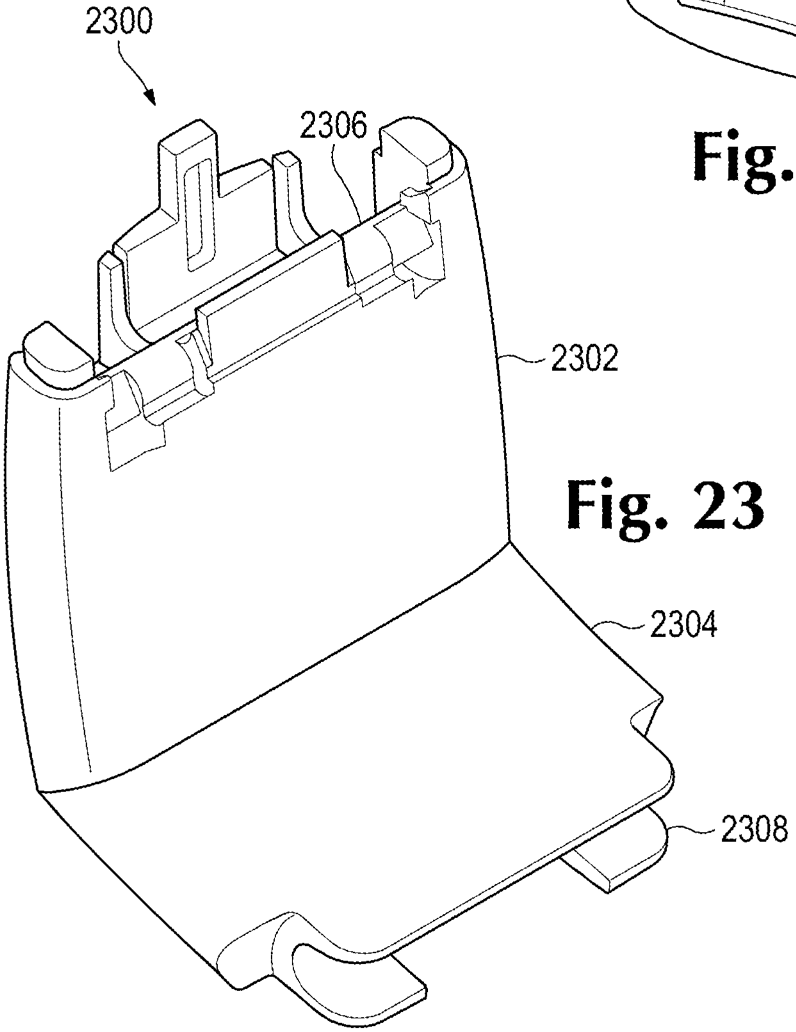
FIG. 23 illustrates a leg and back plate extension for a chest compression device according to some examples of the disclosure.

FIGS. 21-23 illustrate other examples of extensions which may be added to the legs and and/or the back plate to extend the height and/or width of the chest compression device. FIGS. 21 and 22 illustrates a leg extension 2100 which can be added to a leg 2102 to extend the length of the leg 2102. The leg extension 2100 is structured to connect to the back plate 102 in a similar manner as the leg 2102. This can allow a chest compression mechanism to be raised to accommodate patients with a larger sternum height. The leg extension 2100 can include a release mechanism 2104 to release the leg extension 2100 from the back plate. The release of the leg 2102 will release the leg extension 2100 from the leg 2102.

As shown in FIG. 22, the leg extension 2100 can include an auxiliary shaft 2106 similar to a shaft of a back plate to receive the connection from the leg 2102. The leg extension 2100 can also include a connection mechanism 2108, such as a hook or claw, to attach to the back plate of the chest compression device.

FIG. 23 illustrates an alternative leg and back plate extension 2300. The leg and back plate extension 2300 can include both a leg extension portion 2302, similar to the leg extension 2100 discussed above, and a back plate extension portion 2304. The leg extension portion 2302 includes an auxiliary shaft 2306 to attach to a leg of the chest compression device. The connection mechanism of the leg can attach to the auxiliary shaft 2306 in the same manner it would attach to the back plate if no leg extension 2300 was provided.

The back plate extension portion 2304 includes a connection portion 2308 to couple to the shaft of a back plate to extend the width of the back plate. This can allow the chest compression device to be made taller and wider to accommodate larger patients.

FIGS. 24-27 illustrate another example of a chest compression device 2400 that is adjustable to accommodate a variety of patient sizes. Similar to other devices discussed above, chest compression device 2400 includes a base member 2402, which may also be referred to herein as a back plate. The base member 2402 is structured to be positioned or placed underneath a back of a patient 2412. The chest compression device 2400 also includes a housing 2404 that houses a chest compression mechanism 2406. The housing 2404 is structured to be positioned above the chest of the patient and the base member 2402 by two legs 2408 and 2410.

In this example, rather than or in addition to the adjustable legs discussed above in various examples, the base member 2402 can attach to each leg 2408 and 2410 at different heights. That is, rather than the height of the legs changing, the height of the attachment point of the legs 2408 and 2410 to the base member 2402 can be adjusted. The base member 2402 includes two attachment members at each lateral distal end of the base member 2402 which can attach or affix to different connection points or positions on the legs 2408 and 2410.

Figure 24:
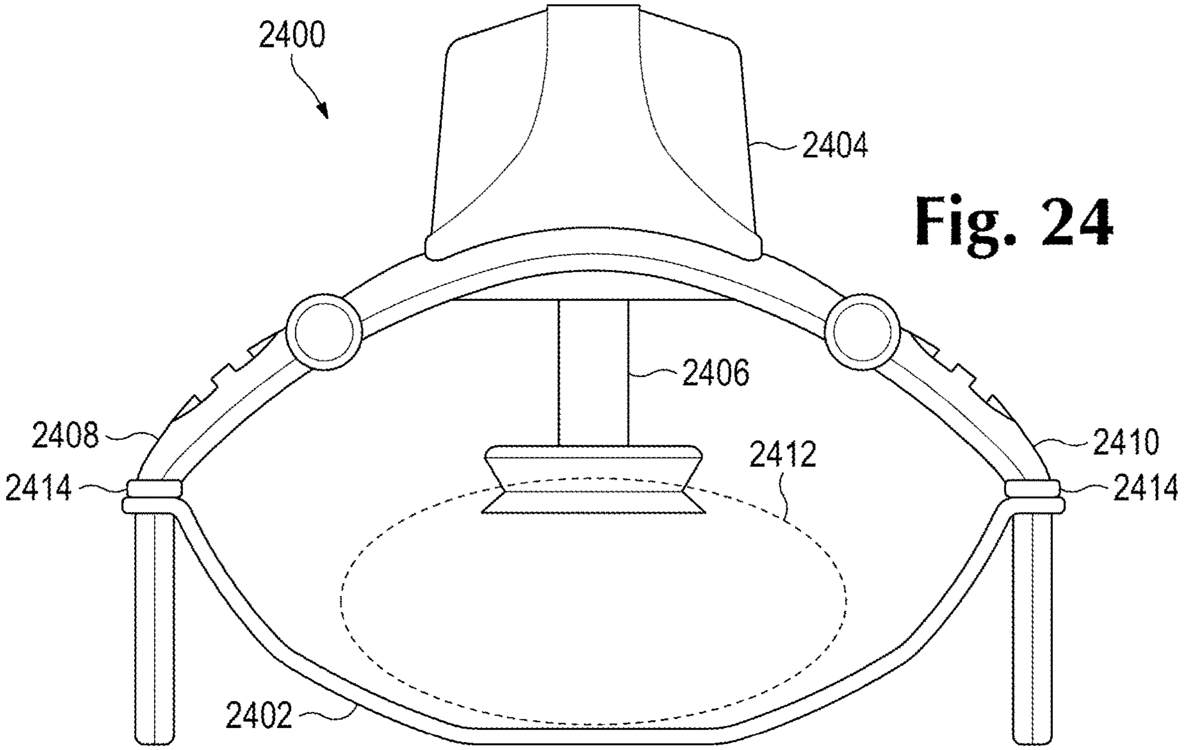
FIGS. 24-26 illustrates a front view of an adjustable CPR device according to some examples of the disclosure.

For example, as seen in FIG. 24, the base member 2402 can connect or attach to each leg 2408 and 2410 at the highest position available on the legs 2408 and 2410 to accommodate a smaller patient 2412. Attaching the base member 2402 attachment members to the highest position allows the space between the compression mechanism 2406 and the base member 2402 to be smaller to bring the compression mechanism 2406 closer to a chest of a smaller patient 2412.

The highest position, in some examples, may result in the legs 2408 and 2410 touching a surface upon which the base member 2402 is resting. In other examples, the legs 2408 and 2410 may extend beyond the surface upon which the base member 2404 is resting, such as if the patient is supported on a cot or gurney that is narrower than the width of the legs 2408 and 2410. The legs 2408 and 2410 may extend past the sides of the cot or gurney.

Figure 25:
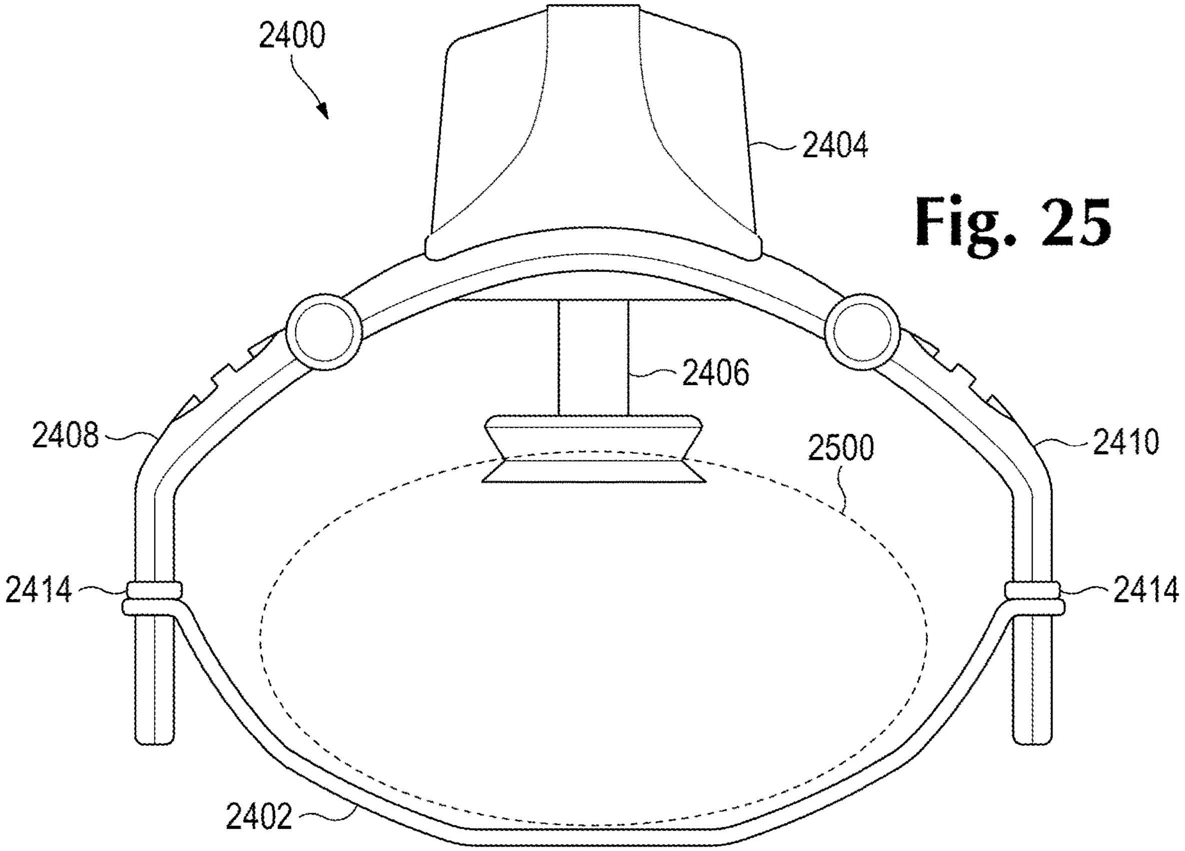
Figure 26:
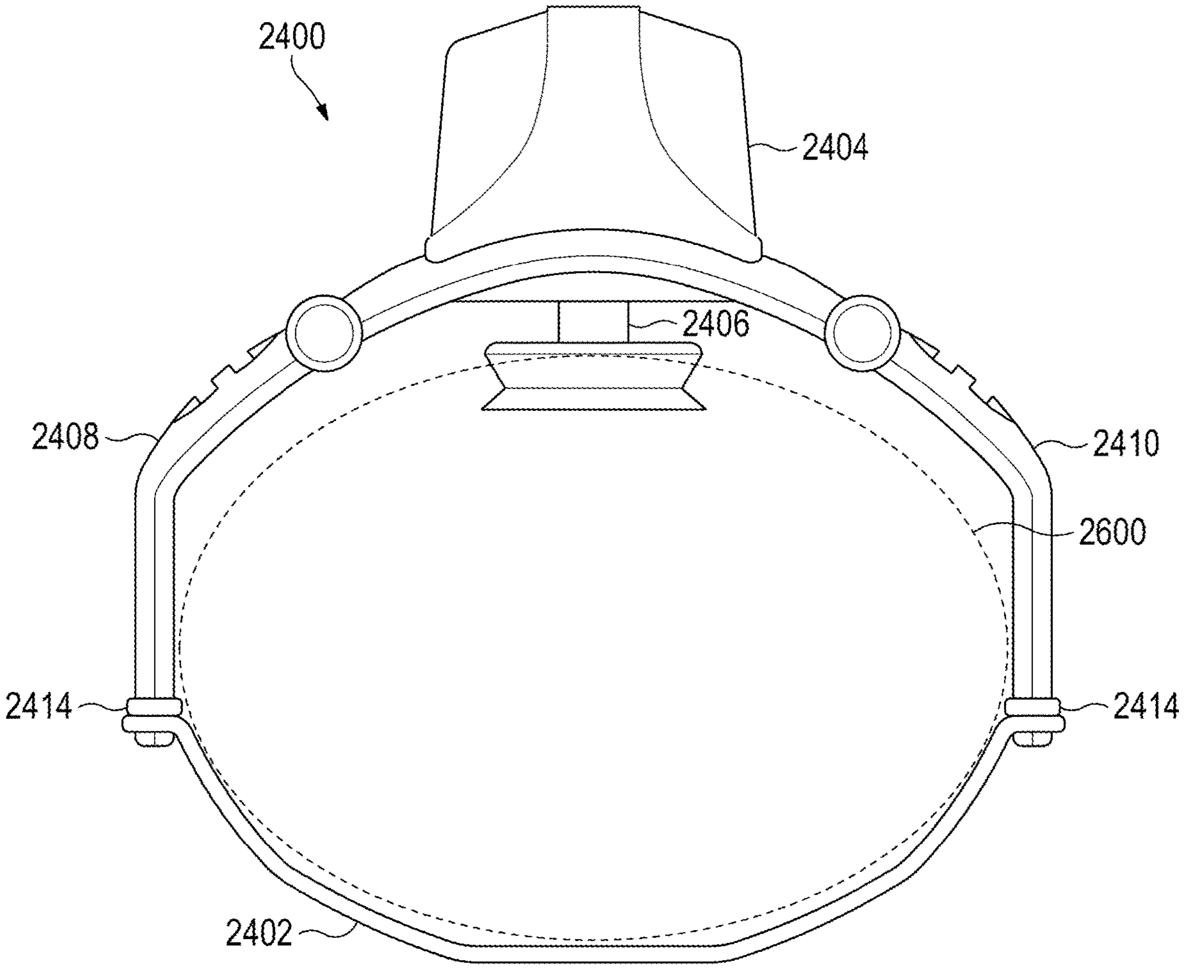

As FIG. 25 illustrates, the base member 2402 can also attach at an intermediary position on the legs 2408 and 2410 to accommodate a different patient 2500 size. Additionally, FIG. 26 illustrates the base member 2402 attached to the lowest point or position on the legs 2408 and 2410 to accommodate a larger patient 2600 to provide additional spacing between the base member 2402 and the compression device 2406. Although FIGS. 24-26 only illustrate three positions, examples of the disclosure are not limited to three positions and multiple attachment points or positions may be provided on the legs 2408 and 2410. The base member 2402 can attach to the legs 2408 and 2410 at any position between the highest position and the lowest position available on the legs 2408 and 2410.

Figure 27:
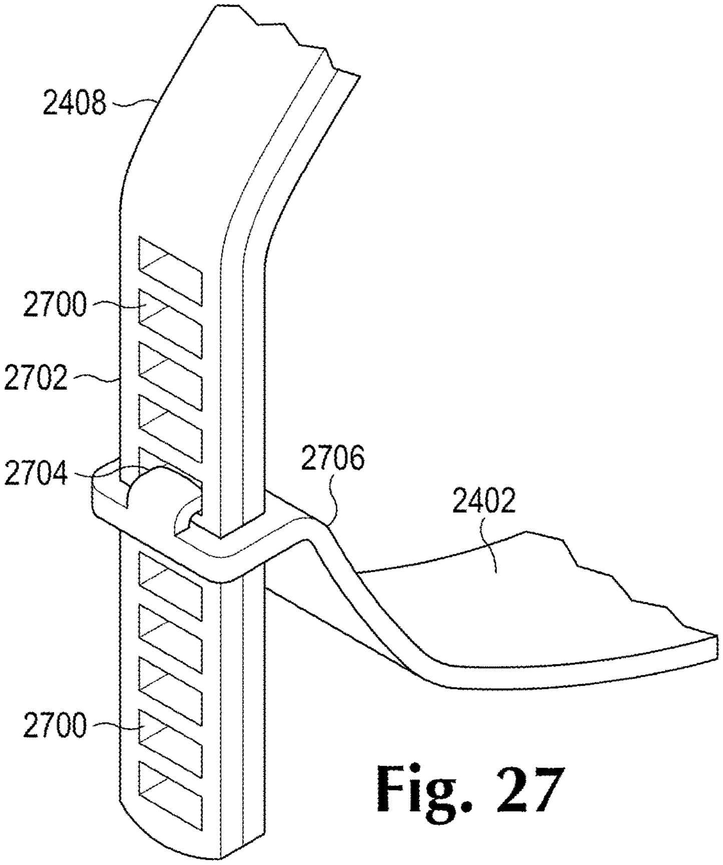
FIG. 27 illustrates a perspective side view of a leg of the adjustable CPR of FIGS. 24-26.

The base member 2402 can connect to the legs 2408 and 2410 using any known type of connection or attachment. FIG. 27 illustrates a perspective side view of leg 2408, according to some examples of the disclosure. For ease of discussion and illustration, only the leg 2408 and a unitary base member 2402 are illustrated. However, as will be understood by one skilled in the art, the housing 2404 attaches to the leg 2408 and a corresponding leg 2410 is also provided.

In some examples, the legs 2408 and 2410 may include a number of apertures 2700 and a clamp or hook 2704 of a distal end 2706 of the base member 2402 may attach to a support beam or rail 2702 between the apertures of the legs 2408 and 2410. That is, the distal end of the base member 2402 may include an aperture with a projection that forms a hook or claw. The leg 2408 or 2410 may fit within the aperture of the base member 2402 to accommodate the hook 2704 connecting or attaching to the rail 2702. In other examples, the distal end of the base member 2404 may not wrap or surround an entirety of the leg 2408. The hook 2704 of the base member 2402 may attach to one of a plurality of rails 2702 located along the respective leg 2408 or 2410.

The rails 2702 in the leg 2408 are located at the same position in the leg 2410. The legs 2408 and 2410 may have printed safety markers printed so that a rescuer can ensure that the base member 2402 is attached to the legs 2408 and 2410 at the same height. In some examples, rather than a clamp or hook, the base member 2402 may include a spring-loaded shaft or pin that can be retracted into the base member 2402 and connected to one of a plurality of holes placed along the length of the legs 2408 and 2410. In yet further examples, the attachment members of the base member 2402 by using a sliding dovetail joint. The attachment member of the base member 2402 may include a protrusion that is structured to be received in a corresponding slot on the legs 2408 and 2410 and a distal end of the base member 2402 with the protrusion can slide into the slot to attach the base member 2402 to the legs 2408 and 2410 at different heights.

In some examples, each of the legs 2408 and 2410 may include a heel 2414 or other device that wraps around the legs 2408 and 2410. The heel 2414 can be moved to align with the position of the base member 2402 attached to the leg 2408 or 2410. For example, although not shown in FIG. 27, the heel 2414 may be adjusted to align with or abut the hook 2704 of the base member 2402. In some examples, the heel 2414 can be used to help lock the base member 2402 to the leg 2408 and 2410. For example, the heel 2414 may clamp against the connection point of the base member 2402 and the leg 2408 or 2410 to ensure the base member 2402 does not disconnect from the respective leg 2408 or 2410.

Figure 28:
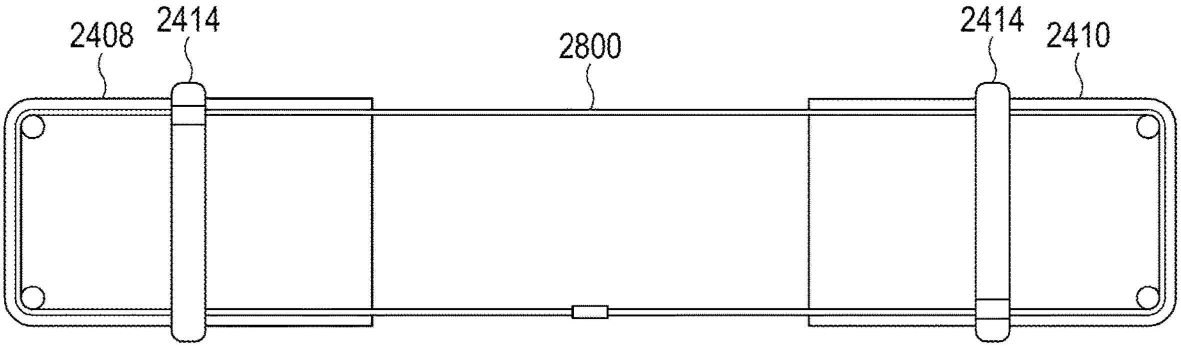
FIG. 28 illustrates a top view of the adjustable CPR device of FIG. 24 with the housing removed.

FIG. 28 illustrates a top view with the housing 2404 removed. A wire 2800 may loop from one leg 2408 to the other leg 2410 around the housing 2404, as shown in FIG. 28. That is, as shown in FIG. 28, the wire 2800 can run along each edge of the legs 2408 and 2410 and around the edge of the housing 2404. The wire 2800 may interact with the heel 2414 to detect the height the base member 2402 is connected to the leg 2408 or 2410. A controller (not shown) may be located within the compression device 2400, such as in the housing 2404 or within one or both of the legs 2408 and 2410. The controller can receive a signal from the wire 2800 based on the location of the heel 2414. Compression depth and/or other parameters may be set based on the height of the attachment point of the legs 2408, 2410 and the base member 2402. For example, if the height of the legs is set so that the housing 2402 is closer to the base member 2402, then the compression depth may be less.

In other examples, rather than a wire, a switch or other sensor may be located on a rail between two apertures within the legs 2408 or 2410. When the base member 2402 attaches to the rail, the switch and/or sensor may be activated to inform a controller of the height. In another example, if a spring-loaded pin is included on the base member 2402, which attaches to a hole in the leg 2408 or 2410, a switch or sensor may be provided within each hole within the legs 2408 and 2140. The switch or sensor within the hole that receives the pin of the base member 2402 can be activated and inform the controller of the height the base member 2402 is attached to the legs 2408 and 2410. In some examples, the controller may transmit an audible or visual alert to inform a rescuer if the legs are attached to the base member 2402 at different heights.

Figure 29:
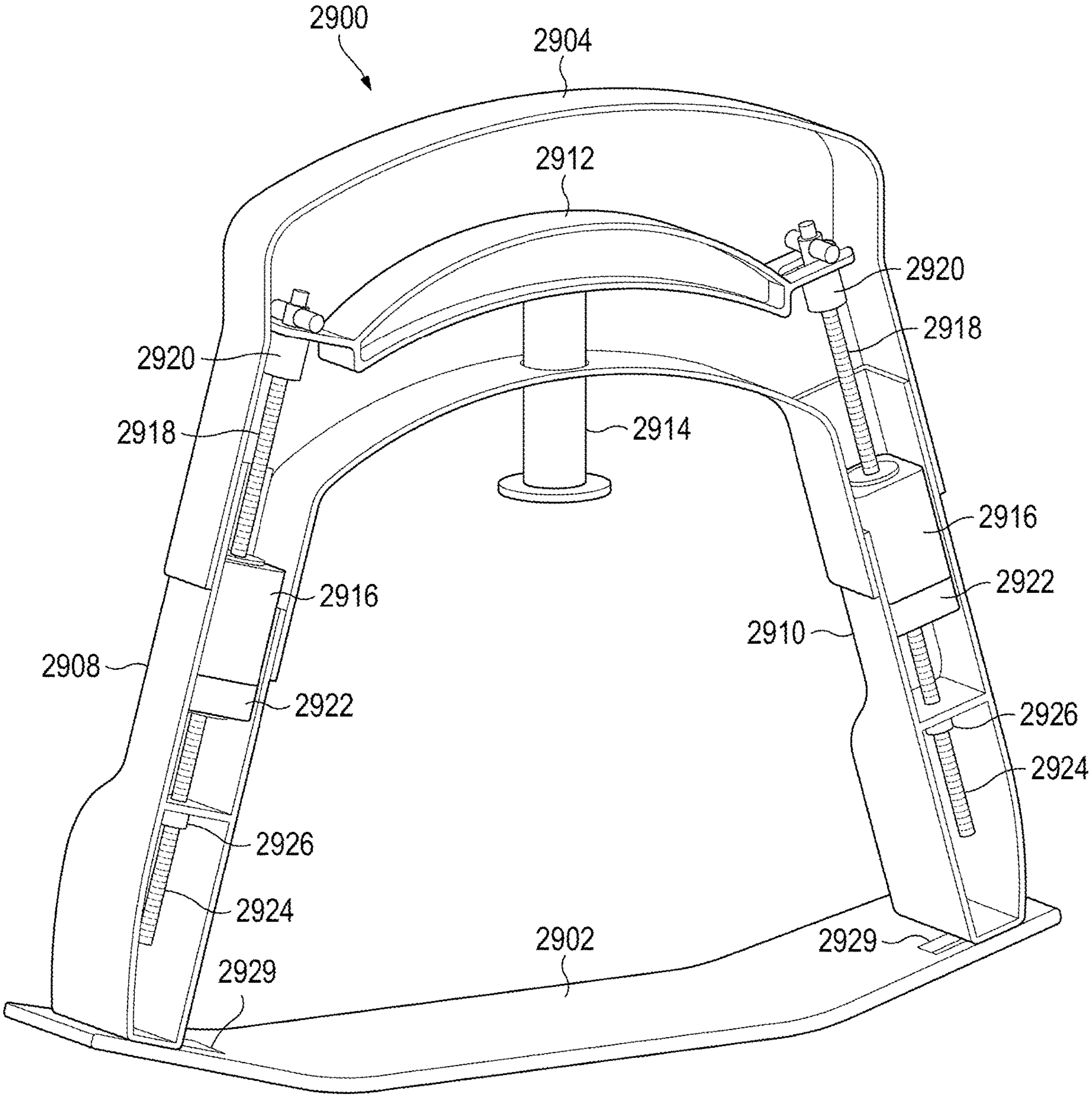
FIG. 29 is a cut-away view of an adjustable CPR device according to some example of the disclosure.

FIG. 29 illustrates a cut-away view of an adjustable mechanical chest compression device 2900 according to some examples of the disclosure. The chest compression device 2900 includes a base member 2902, which may also be referred to herein as a back plate. The base member 2902 is structured to be positioned or placed underneath a back of a patient. The chest compression device 2900 also includes a housing 2904 that includes a chest compression mechanism 2906. The housing 2904 is structured to be positioned above the chest of the patient by two adjustable legs 2908 and 2910. The housing 2904 may include a beam 2912 with a piston 2914.

The housing 2904 and the two adjustable legs 2908 and 2910 may overlap. For examples, the housing 2904 may extend over the two adjustable legs 2908 and 2910, as shown in FIG. 29. However, in other examples, the two adjustable legs 2908 and 2910 may extend over the housing 2904. Having the housing 2904 and the two adjustable legs 2908 and 2910 overlap, or be telescoping, can allow the height of the legs to be adjusted so that the beam 2912 and piston 2914 can be positioned closer to or further from the base member 2902.

The two adjustable legs 2908 and 2910 may each include a first motor 2916 and a first threaded shaft 2918. The threaded shaft 2918 can engage a ball screw carrier 2920. The ball screw carrier 2920 can be connected to one end of the beam 2912. When the motor 2916 turns the threaded shaft 2918, the ball screw carrier 2920 moves linearly up or down; the end of the beam 2912 attached to the ball screw carrier 2920 moves with the movement of the ball screw carrier 2920. While a threaded shaft 2918 and ball screw carrier 2920 configuration have been depicted in FIG. 29, it is possible for alternative linear motion devices may be employed to move the end of the beam 2912, such as a pneumatic actuator and other similar linear motion devices. The motors 2916 in each leg work in concert to move the beam toward and away from the base member 2902, while generally keeping the beam 2912 parallel.

Each of the two adjustable legs 2908 and 2910 may also include a second motor 2922 and a second threaded shaft 2924. The second motor 2922 can be attached or fixated to the first motor 2916 in some examples, but examples of the disclosure are not limited to this configuration. In other examples, the second motor 2922 may be provided away from the first motor 2916, such as near the end of the leg that attached to the base member 2902. The second threaded shaft 2924 of each support leg 2908 and 2910 can be connected to the respective support leg by a nut 2926. The support legs 2908 and 2910 can each be telescoping, such that when the second motor 2922 turns the threaded shaft 2924, both the beam 2912 with the piston 2914 and the legs 2908 and 2910 are adjusted in height to bring the piston 2914 closer to the base member 2902 and a chest of a patient, if the patient is small, or further from the base member 2902 and the chest of the patient to accommodate a larger patient.

The beam 2912 and piston 2914 move upwards or downwards to adjust height, depending on the direction the motor 2922 is spinning by lengthening or shortening the support legs 2908 and 2910. The support legs 2908 and 2910 adjust towards or from the center of the device 2900. This can allow the compression device 2900 size to be adapted to accommodate a variety of different sized patients. As the support legs 2908 and 2910 extend in length by the motor 2922 spinning, the legs can move outward toward an edge or distal end of the base member 2902, or inwards as the support legs 2908 and 2910 are shortened. The motors 2922 in each leg 2908 and 2910 can work in concert lengthen or shorten each leg 2908 and 2910 in unison.

While a threaded shaft 2924 configuration has been depicted in FIG. 29, it is possible for alternative linear motion devices may be employed to adjust the height of the legs 2908 and 2910, such as a pneumatic actuator and other similar linear motion devices. Once the second motors 2922 have been positioned, the second motors 2922 can withstand high forces, such as when the first motors 2916 are moving the beam 2912 and piston 2914 downward to provide compressions to a chest of a patient.

The motors 2916 and 2922 can be powered by batteries, such as rechargeable batteries located in within the compression device 2900, such as either in the housing 2904 or within one or both of the legs 2908 and/or 2910, or by an external power source, such as an electrical outlet. The compression device 2900 can also include a control unit (not shown) configured to control operation of the motors 2916 and 2922, and thus movement of the beam 2912 and adjusting the height of the beam 2912 and legs 2908 and 2910.

The control unit can also accept user inputs related to operation of the mechanical CPR device 2900. The compression device 2900 can include a user input device (not shown) that allows the user to input selections. Such a user input device can include one or more buttons, a display, a touchscreen and/or any other component on the exterior compression device 2900. The compression device 2900 can also accept user inputs wirelessly from an external computing device.

For example, a user can input a desired compression depth of the beam 2912 (i.e., how far the beam 2912 moves toward base member 2902 during a compression), a desired frequency of compressions, a desired speed of the beam 2912 during compressions, a start compression and stop compression command, adjusting a height of the beam 2912 and piston 2914, and the like. In some examples, an end of the piston 2914 or a suction cup attached to the piston 2914 may include a sensor to indicate when the piston 2914 or suction cup are touching and/or attached to a chest of a patient, and the sensor can send a signal to the control unit to stop adjustment of the height of the legs 2908 and 2910.

The base member 2902 may have slots 2929 on each of the distal ends of the base member 2902 in which the legs 2908 and 2910 are attached. As the legs 2908 and 2910 are adjusted by the second motor 2922 and the threaded shaft 2924, the legs 2908 and 2910 can slide within the slots 2929 of the base member 2902 to provide stability to the housing 2904. For example, as the second motor 2922 moves the legs 2908 and 2910 to adjust the height between the housing 2904 and the base member 2904 to be shorter, the width between the legs 2908 and 2910 also becomes less, while conversely, as the second motor 2922 moves the legs 2908 and 2910 to adjust the height between the housing 2904 and the base member 2904 to be greater, the width between the legs 2908 and 2910 also becomes greater. That is, the legs 2908 and 2910 move within the slots 2929 when the height of the compression device 2900 is adjusted.

Additionally or alternative to the slots 2929 in the base member 2902, the base member 2902 may be adjustable in some examples. The adjustable base member 2902 may be structured to extend or retract laterally as the legs 2908 and 2910 change width during movement of the legs 2908 and 2910. For example, the adjustable base member 2902 may be telescopic or in some examples, the legs 2908 and 2910 may include attachment members, such as a claw or hook, that can connect to a connection rail, as shown in some examples above. The connection rails in such examples may slide laterally to adjust the width of the base member 2902 as the legs 2908 and 2910 extend or retract in length.

The first motor 2916 and the second motor 2922 can move and be controlled independently of each other. The control unit can operate the first motor 2918 in each leg in unison or concert to coordinate movement of the beam 2912 and piston 2914 to provide compressions. The control unit can also operate the second motor 2922 in each leg 2908 and 2910 in unison or concert to adjust the height and width of the legs 2908 and 2910.

Figure 30:
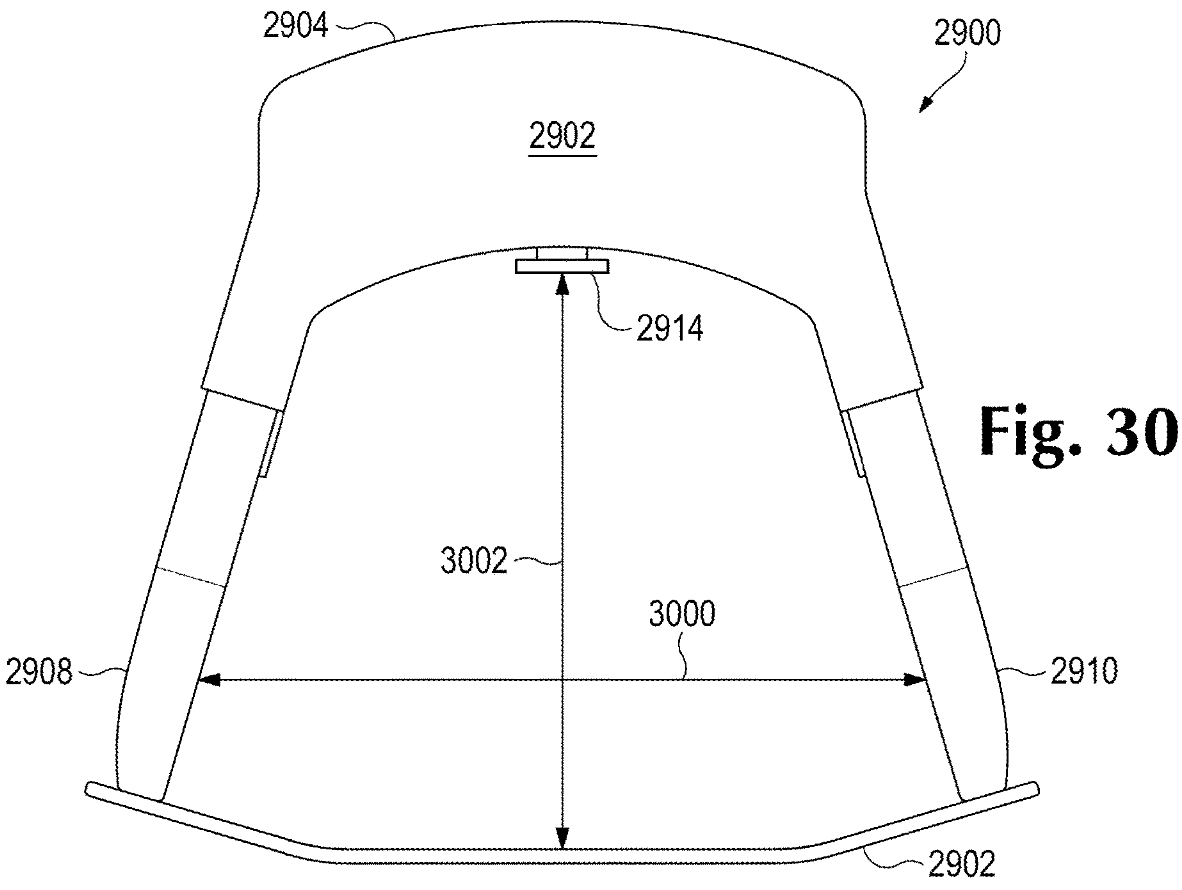
FIGS. 30-32 illustrate different positions of the adjustable CPR device of FIG. 28.
Figure 31:
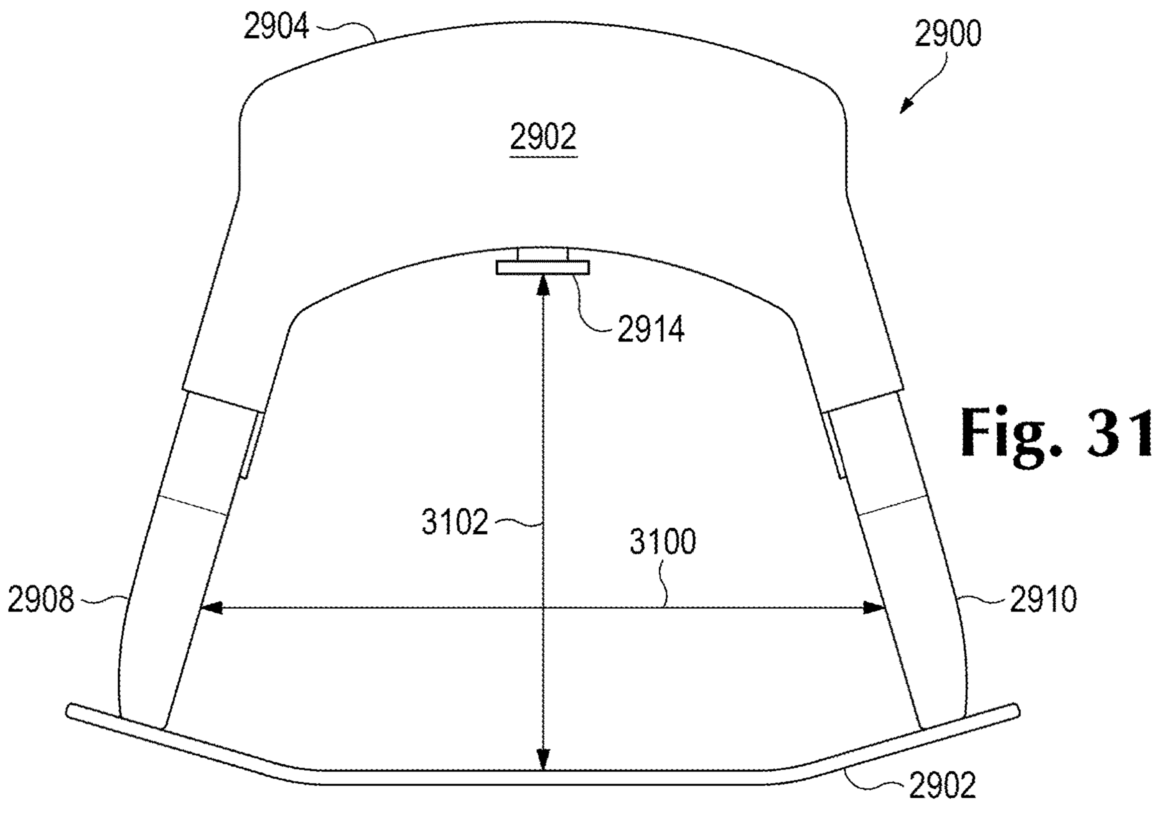
Figure 32:
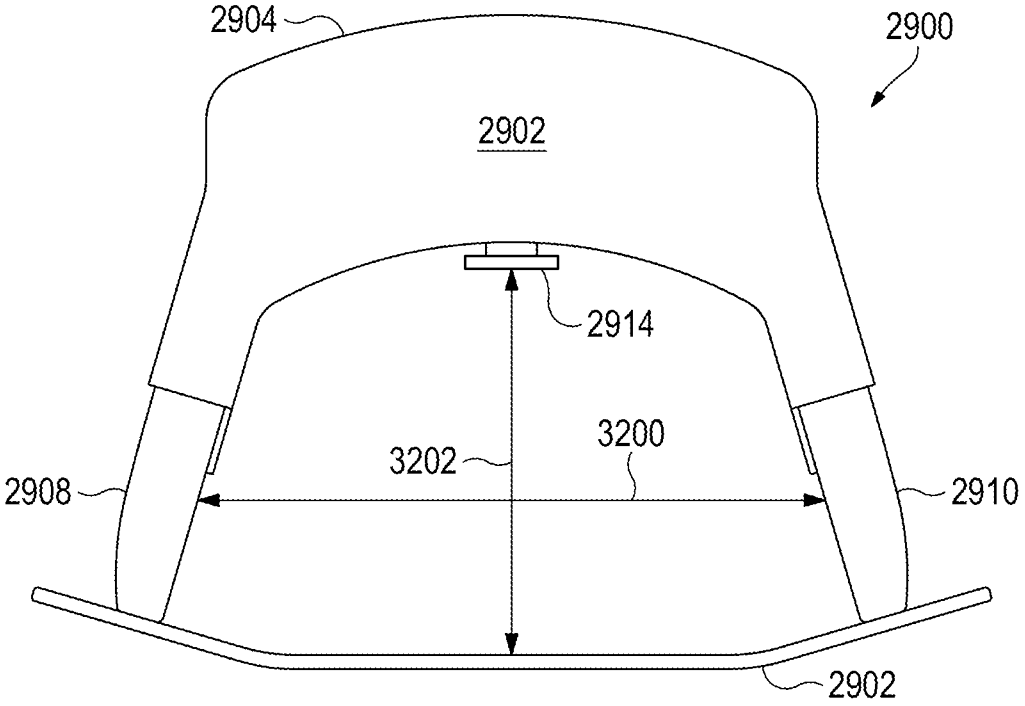

FIGS. 30-32 illustrate the chest compression device 2900 at different heights and widths. As can be seen in FIG. 29, the second motor 2922 has adjusted the height and width of the legs to accommodate a larger size patient. The space between the legs 2908 and 2910, illustrated by arrow 3000, as well as the space between the base member 2902 and the housing 2904, illustrated by arrow 3002, has been extended to accommodate a large chest height of a patient.

FIG. 31 illustrates the chest compression device 2900 at a mid-level height to accommodate a smaller patient. Arrow 3100 shows that the space between legs 2908 and 2910 is less than the space 3000 in FIG. 30, while arrow 3102 shows that the space between the housing 2904 and the base member 2902 is less than the arrow 3002. FIG. 32 illustrates the chest compression device 2900 at the lowest position to accommodate an even smaller patient, such as a small adult or pediatric patient. Arrow 3200 shows that the space between legs 2908 and 2910 is less than the space 3000 and 3100 in FIGS. 30 and 31, while arrow 3202 shows that the space between the housing 2904 and the base member 2902 is less than the arrow arrows 3002 and 3102.

While three positions are shown in FIGS. 30-31 of the chest compression device 2900, as will be understood by one skilled in the art, the second motor 2922 can allow for a variety of different positions between the most extended position, as shown in FIG. 30, and most retracted position, as shown in FIG. 32. The motor 2922 can allow for fine tuning of the height of the legs 2908 and 2910.

Additionally, examples of the disclosure are not limited to two legs or arms, as discussed above in various examples. To provide more stability, additional arms or legs may be attached a compression device and be place symmetrically or asymmetrically around a base member or back plate to provide further stability during compressions. Using FIG. 1 as an example, two legs 108 may be provided on side of the base member 102 and the housing 104, and two legs 110 may be provided on the other side of the base member 102 and the housing 104. The base member 102 may include four connection points, two on each side of the base member 104.

Each of the examples discussed above allow for a single chest compression device that can accommodate a larger number of patient sizes, while still operating in an optimal manner. This can ease the burden of carrying multiple sizes of chest compression devices for an emergency responder and having the ability to compress the chest of patients in a wide variety of sizes.

This written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

I claim:

1. An adjustable cardiopulmonary resuscitation (CPR) device for accommodating a variety of patient sizes, comprising:

- a housing, the housing including a chest compression mechanism structured to deliver chest compressions;
- a first leg attached to the housing, the first leg including a plurality of apertures positioned along the first leg and a plurality of rails between the apertures, the first leg further including a first attachment position at one of the plurality of rails of the first leg and a second attachment position at another of the plurality of rails of the first leg;

a second leg attached to the housing, the second leg including a first attachment position and a second attachment position; and a base member formed as a unitary structure, wherein the base member is configured to be placed underneath a patient and support a patient's back, the base member having a first attachment member at a distal end structured to removably attach to the first attachment position or the second attachment position of the first leg and a second attachment member structured to removably attach to the first attachment position or the second attachment position of the second leg.

2. The adjustable CPR device of claim 1, further comprising a height sensor configured to detect whether the first attachment member of the base member is attached to the first attachment position or the second attachment position of the first leg and to detect whether the second attachment member of the base member is attached to the first attachment position or the second attachment position of the second leg.

3. The adjustable CPR device of claim 2, further comprising a control unit, the control unit configured to receive an output from the height sensor and set a parameter of compressions based on the detected heights.

4. The adjustable CPR device of claim 3, wherein the control unit is further configured to output an alert if the height sensor detects the first attachment member is attached to the first attachment position and the second attachment member is attached to the second attachment position.

5. The adjustable CPR device of claim 2, wherein the height sensor includes a wire that can detect an attachment position in each of the first leg and the second leg.

6. The adjustable CPR device of claim 1, wherein each of the first leg and the second leg includes more than two attachment positions.

7. The adjustable CPR device of claim 1, further comprising a locking mechanism structured to lock a respective attachment member of the base member to a respective attachment position of each of the first leg and the second leg.

8. The adjustable CPR device of claim 1, wherein the second leg includes a plurality of apertures positioned along the second leg and a plurality of rails between the apertures, the second leg having a first attachment position at one of the plurality of rails of the second leg and a second attachment position at another of the plurality of rails of the second leg.

9. The adjustable CPR device of claim 8, wherein the first attachment member and the second attachment member are each a hook or claw that is structured to removably attach to one of the rails of the first leg and one of the rails of the second leg.

10. An adjustable cardiopulmonary resuscitation (CPR) device for accommodating a variety of patient sizes, comprising:

a housing, the housing including a chest compression mechanism structured to deliver chest compressions;

a first leg having a first end attached to the housing and a distal end, the first leg including a plurality of attachment points extending between the first end and the distal end, the plurality of attachment points comprising a plurality of apertures positioned along the first leg and a plurality of rails between the apertures;

a second leg having a first end attached to the housing and a distal end, the second leg including a plurality of attachment points extending between the first end and the distal end; and a base member formed as a unitary structure and structured to be placed underneath a patient and support a patient's back, the base member including a first distal end having a first attachment member structured to attach to one of the plurality of attachment points in the first leg and a second distal end having a second attachment member structured to attach to one of the plurality of attachment points in the second leg.

11. The adjustable CPR device of claim 10, further comprising a height sensor configured to detect which one of the plurality of attachment points of the first leg the first attachment member of the base member is attached and to detect which one of the plurality of attachment points of the second leg the second attachment member of the base member is attached.

12. The adjustable CPR device of claim 11, further comprising a controller configured to receive an output from the height sensor and set a compression parameter based on output.

13. The adjustable CPR device of claim 12, wherein the controller is further configured to output an alert if the height sensor detects the first attachment member and the second attachment member are at uneven heights.

14. The adjustable CPR device of claim 11, wherein the height sensor includes a wire that can detect an attachment point in each of the first leg and the second leg.

15. The adjustable CPR device of claim 10, further comprising a locking mechanism structured to lock a respective attachment member of the base member to a respective attachment point of each of the first leg and the second leg.

16. The adjustable CPR device of claim 10, wherein the plurality of attachment points of the second leg comprises a plurality of apertures positioned along the second leg and a plurality of rails between the apertures.

17. The adjustable CPR device of claim 16, wherein the first attachment member and the second attachment member are each a hook or claw that is structured to removably attach to one of the rails of the first leg and one of the rails of the second leg.

18. The adjustable CPR device of claim 10, wherein the first attachment member attaches to an attachment point of the first leg closest to the housing and the second attachment member attaches to an attachment point of the second leg closest to the housing when accommodating a smaller patient.

* * * * *